United States Patent
Ikebuchi

(10) Patent No.: US 10,739,126 B2
(45) Date of Patent: Aug. 11, 2020

(54) THREE-DIMENSIONAL COORDINATE MEASURING DEVICE

(71) Applicant: Keyence Corporation, Osaka (JP)

(72) Inventor: Masayasu Ikebuchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 16/448,303

(22) Filed: Jun. 21, 2019

(65) Prior Publication Data
US 2020/0041250 A1    Feb. 6, 2020

(30) Foreign Application Priority Data

Aug. 1, 2018  (JP) .................. 2018-145463

(51) Int. Cl.
| | | |
|---|---|---|
| *G01B 11/00* | (2006.01) | |
| *G06T 7/73* | (2017.01) | |
| *H04N 5/247* | (2006.01) | |
| *H04N 5/232* | (2006.01) | |
| *H04N 5/225* | (2006.01) | |
| *G01C 15/00* | (2006.01) | |
| *G01C 15/06* | (2006.01) | |

(52) U.S. Cl.
CPC ............ *G01B 11/007* (2013.01); *G01C 15/00* (2013.01); *G01C 15/002* (2013.01); *G01C 15/06* (2013.01); *G06T 7/74* (2017.01); *H04N 5/2253* (2013.01); *H04N 5/23299* (2018.08); *H04N 5/247* (2013.01); *G06T 2207/30204* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 9,551,566 B2 | 1/2017 | Wakai | |
| 9,557,159 B2 | 1/2017 | Ikebuchi | |
| 9,778,023 B2 | 10/2017 | Osaki et al. | |
| 9,885,564 B2 | 2/2018 | Osaki et al. | |

(Continued)

FOREIGN PATENT DOCUMENTS

JP        2015-194452 A     11/2015

OTHER PUBLICATIONS

U.S. Appl. No. 16/448,318, filed Jun. 21, 2019 (147 pages).

*Primary Examiner* — Rebecca A Volentine
(74) *Attorney, Agent, or Firm* — Kilyk & Bowersox, P.L.L.C.

(57) ABSTRACT

To provide a three-dimensional coordinate measuring device capable of measuring coordinates over a wide, range with high accuracy and high reliability. A reference stand 10 is provided on an installation surface. A reference camera 110 is fixed to the reference stand 10. A movable camera 120 and a reference member 190 having plurality of markers are rotatably supported on the reference stand 10. The reference camera 110, the movable camera 120, and the reference member 190 are accommodated in a casing 90. The movable camera 120 captures a probe that makes contact with a measurement target and the reference camera 110 captures the plurality of markers of the reference member 190. The coordinates of a point at which the probe makes contact with the measurement target are calculated based on the image data obtained by the capturing.

9 Claims, 12 Drawing Sheets

(56) References Cited

U.S. PATENT DOCUMENTS

| | | | |
|---|---|---|---|
| 10,267,620 B2 | 4/2019 | Ikebuchi | |
| 2010/0303300 A1* | 12/2010 | Svanholm | G01C 15/00 |
| | | | 382/106 |
| 2012/0262573 A1* | 10/2012 | Bridges | G01S 7/491 |
| | | | 348/135 |
| 2013/0155225 A1* | 6/2013 | Kumagai | G01C 15/002 |
| | | | 348/137 |
| 2015/0042977 A1* | 2/2015 | Siercks | G01C 15/002 |
| | | | 356/4.01 |
| 2015/0276389 A1* | 10/2015 | Osaki | G01B 9/00 |
| | | | 348/136 |
| 2017/0314911 A1 | 11/2017 | Futami | |

* cited by examiner

THREE-DIMENSIONAL COORDINATE MEASURING DEVICE

CROSS-REFERENCE TO RELATED APPLICATIONS

The present application claims foreign priority based on Japanese Patent Application No. 2018-145463, filed Aug. 1, 2018, the contents of which is incorporated herein by reference.

BACKGROUND OF THE INVENTION

1. Field of the Invention

The present invention relates to a three-dimensional coordinate measuring device using a contact-type probe.

2. Description of Related Art

A contact-type three-dimensional coordinate measuring device is provided with a probe having a contact part. The contact part of the probe is brought into contact with a measurement target and the contact position between the measurement target and the contact part is calculated. The dimensions of a desired part of the measurement target are measured by calculating a plurality of positions on the measurement target.

An optical coordinate measuring device described in JP-A-2015-194452 as one example of a three-dimensional coordinate measuring device includes a mounting table, a probe, and an imaging unit.

The contact part of the probe is brought into contact with the measurement target placed on the mounting table. An imaging unit generates image data by capturing a plurality of markers provided on the probe. The coordinates of the contact position between the measurement target and the contact part are calculated based on the image data.

In the optical coordinate measuring device described above, an imaging unit and a mounting table are integrally held by a holding section so that the area above a mounting table is captured by the imaging unit. In this structure, the imaging visual field of the imaging unit is set so as to cover a portion above the mounting table.

However, when coordinates of the measurement target larger than the mounting table is measured, the imaging visual field of the imaging unit needs to be enlarged. When the angle of view of imaging unit is increased to enlarge the imaging visual field, the resolution of image data obtained by capturing is reduced. In addition, the optical coordinate measuring device needs to measure coordinates with high reliability without being affected by disturbance light, dust, and the like.

SUMMARY OF THE INVENTION

An object of the invention is to provide a three-dimensional coordinate measuring device capable of measuring coordinates over a wide range with high accuracy and high reliability.

(1) A three-dimensional coordinate measuring device according to the invention includes a probe that has a plurality of measurement markers and instructs a measurement point on a measurement target; a reference base provided on an installation surface; a reference imaging unit fixed to the reference base; a movable imaging unit provided movably relative to the reference base, the movable imaging unit capturing a plurality of measurement markers of the probe; a reference marker provided on the reference base so as to be rotatable together with the movable imaging unit, the reference marker being capturable by the reference imaging unit; a casing in which the reference imaging unit, the movable imaging unit, and the reference marker are accommodated; and a calculation unit that generates first position/posture information indicating a position and a posture of the movable imaging unit based on reference image data indicating an image of the reference marker captured by the reference imaging unit, generates second position/posture information indicating a position and a posture of the probe with respect to the movable imaging unit based on measurement image data indicating an image of the plurality of measurement markers captured by the movable imaging unit, generates third position/posture information indicating a position and a posture of the probe with respect to the reference imaging unit based on the generated first and second position/posture information, and calculates coordinates of the measurement point indicated by the probe based on the generated third position/posture information.

In the three-dimensional coordinate measuring device, the reference base is provided on a contact surface. Since the reference imaging unit is fixed to the reference base, the installation state is stable. Accordingly, the first position/posture information can be generated with high accuracy by capturing the reference marker using the reference imaging unit.

The movable imaging unit is rotatable relative to the reference base. In this case, by rotating the movable imaging unit, the range that can be captured by the movable imaging unit can be widened without enlarging the imaging visual field of the movable imaging unit. Accordingly, by capturing the plurality of measurement markers of the probe using the movable imaging unit, the second position/posture information can be generated with high accuracy.

In addition, since the reference imaging unit, the movable imaging unit, and the reference marker are accommodated in the casing in the structure described above, dust and disturbance light are less likely to enter the space surrounding the reference imaging unit, the movable imaging unit, and the reference marker. Accordingly, the reliability of the third position/posture information generated based on the first and second position/posture information is improved.

The coordinates of the measurement point on the measurement target are calculated based on the generated third position/posture information. As a result, the coordinates can be measured over a wide range with high accuracy and high reliability.

(2) The three-dimensional coordinate measuring device may further include a movable member provided rotatably relative to the reference base, the movable imaging unit being fixed to the movable member, in which the reference marker may be provided on at least one of the movable imaging unit and the movable member.

Since the reference marker and the movable imaging unit move integrally with each other in this case, the first position/posture information can be generated with high accuracy.

(3) The movable member may have an attachment section to which a movable imaging unit is fixed, the reference marker may be provided on the movable member so as to face a side opposite to the attachment section, and the reference imaging unit may be placed on a side opposite to the movable imaging unit with respect to the movable member.

In this case, the first position/posture information can be generated in a simple structure.

(4) The reference imaging unit may be fixed to the reference base so that an imaging visual field of the reference imaging unit faces upward and the movable member may be provided above the reference imaging unit.

In this case, the reference imaging unit can be fixed to the reference base easily and stably. Accordingly, the first position/posture information can be generated with high accuracy.

(5) The three-dimensional coordinate measuring device may further include a space blocking member that spatially blocks an imaging space including an imaging visual field of the reference imaging unit from the reference imaging unit to the reference marker, from an outside of the imaging space.

In this case, hot air or the like is prevented from entering the imaging space of the reference imaging unit from the outside of the imaging space. Accordingly, the light incident on the reference imaging unit is prevented from being refracted due to the fluctuation of the atmosphere in the imaging space. As a result, the first position/posture information can be generated with higher accuracy.

(6) The three-dimensional coordinate measuring device may further include a light blocking member that optically blocks the imaging space including the imaging visual field of the reference imaging unit from the reference imaging unit to the reference marker, from the outside of the imaging space.

In this case, light is prevented from entering the imaging space of the reference imaging unit from the outside. This prevents light from entering the reference imaging unit from the outside. As a result, the first position/posture information can be generated with higher accuracy.

(7) The reference base may have a fixing section to which the reference imaging unit is fixed and a leg section that supports the fixing section on the installation surface.

In this case, the fixing section is stably supported on the installation surface by the leg section. This makes the fixation state of the reference imaging unit stable.

(8) The three-dimensional coordinate measuring device may further include a rotation driving unit that rotates the movable imaging unit relative to the reference base and a rotation control unit that controls the rotation driving unit so that the plurality of measurement markers is positioned within an imaging visual field of the movable imaging unit.

In this case, even when the probe moves, the imaging visual field of the movable imaging unit follows the plurality of measurement markers of the probe. Therefore, the user does not need to adjust the imaging visual field of the movable imaging unit. Accordingly, the coordinates of a desired measurement point of the measurement target can be measured over a wide range without the need for a complicated adjustment operation.

(9) The three-dimensional coordinate measuring device may further include an accepting unit that accepts a geometric element and a measurement item selected from a plurality of predetermined geometric elements and a plurality of predetermined measurement items and a measurement unit that calculates a value of the selected measurement item concerning the selected geometric element specified by one or more measurement points in the measurement target based on the geometric element and the measurement item accepted by the accepting unit and coordinates of the one or more measurement points calculated by the calculation unit.

In this case, the user can easily measure a desired physical quantity of the measurement target by selecting a desired geometric element and measurement item from the plurality of predetermined geometric elements and the plurality of predetermined measurement items.

According to the invention, it is possible to measure coordinates over a wide range with a high accuracy and high reliability.

DESCRIPTION OF EMBODIMENTS

Figure 1:
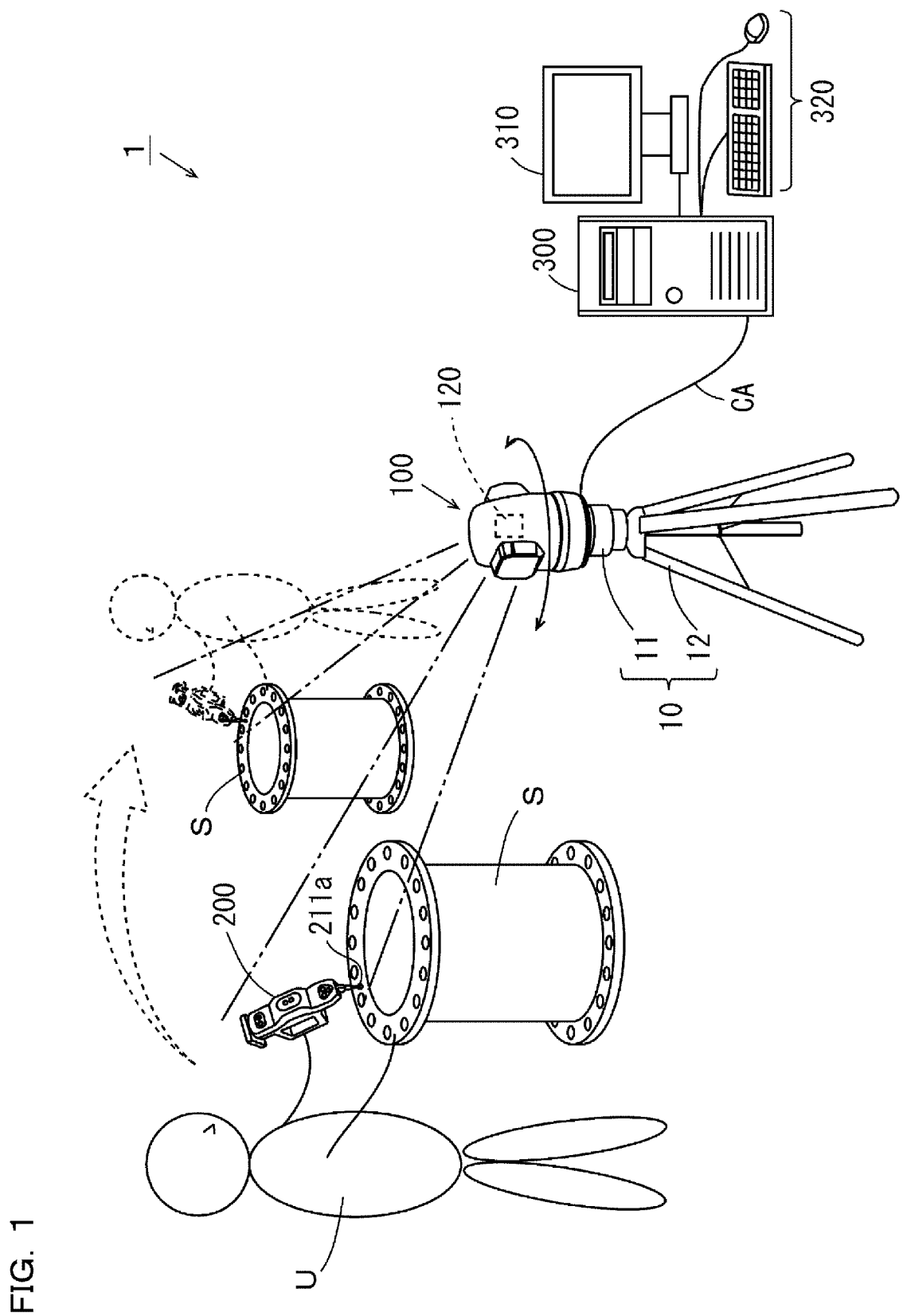
FIG. 1 is a schematic view illustrating an example of use of a three-dimensional coordinate measuring device according to an embodiment of the invention.

[1] Basic Structure and Example of Use of a Three-Dimensional Coordinate Measuring Device FIG. 1 is a schematic view illustrating an example of use of a three-dimensional coordinate measuring device according to an embodiment of the invention. As illustrated in FIG. 1, a three-dimensional coordinate measuring device 1 according to the embodiment of the invention mainly includes an imaging head 100, a probe 200, and a processing device 300 and is used to measure, for example, physical quantities such as the dimensions of portions of a large measurement target S. In the example in FIG. 1, a large pipe is illustrated as the measurement target S. The measurement target S is placed on a floor surface.

The probe 200 is carried by a user U. The probe 200 has a contact part 211a. The user U brings the contact part 211a of the probe 200 into contact with a desired portion of the measurement target S. The portion of the measurement target S that makes contact with the contact part 211a is a measurement point.

The imaging head 100 is fixed by a reference stand 10 to, for example, the floor surface as an installation surface. A movable camera 120 is provided in the imaging head 100. The movable camera 120 captures a plurality of markers eq (FIG. 9), which will be described later, provided on the probe 200. The reference stand 10 is a tripod stand and includes a fixing section 11 and a leg section 12. The fixing section 11 has a flat upper surface. The reference stand 10 is configured to enable posture adjustment between the fixing section 11 and the leg section 12 so that the upper surface of the fixing section 11 is fixed horizontally. The upper surface of the fixing section 11 is assumed to be fixed horizontally in the following description.

In addition, the imaging head 100 is connected to the processing device 300 via a cable CA. The processing device 300 is, for example, a personal computer to which a main body display unit 310 and a main body operation unit 320 are connected. In the processing device 300, the coordinates of a measurement point on the measurement target S are calculated based on the image data (referred to below as measurement image data) obtained by capturing the probe 200 using the movable camera 120 and reference image data described later. The coordinates of one or more measurement points on the measurement target S are calculated and, based on the calculation result, the physical quantities of the measurement target S are measured.

When the user U moves while carrying the probe 200, as illustrated in FIG. 1 by the dotted line arrow, the orientation of the imaging visual field of the movable camera 120 follows the movement of the probe 200. That is, the orientation of the movable camera 120 changes so that the probe 200 is positioned within the imaging visual field of the movable camera 120 when the probe 200 moves. Accordingly, the three-dimensional coordinate measuring device 1 has a wide measurable area. The structures of individual portions of the three-dimensional coordinate measuring device 1 will be described in detail below.

[2] Structures of the Imaging Head 100 and the Processing Device 300

Figure 2:
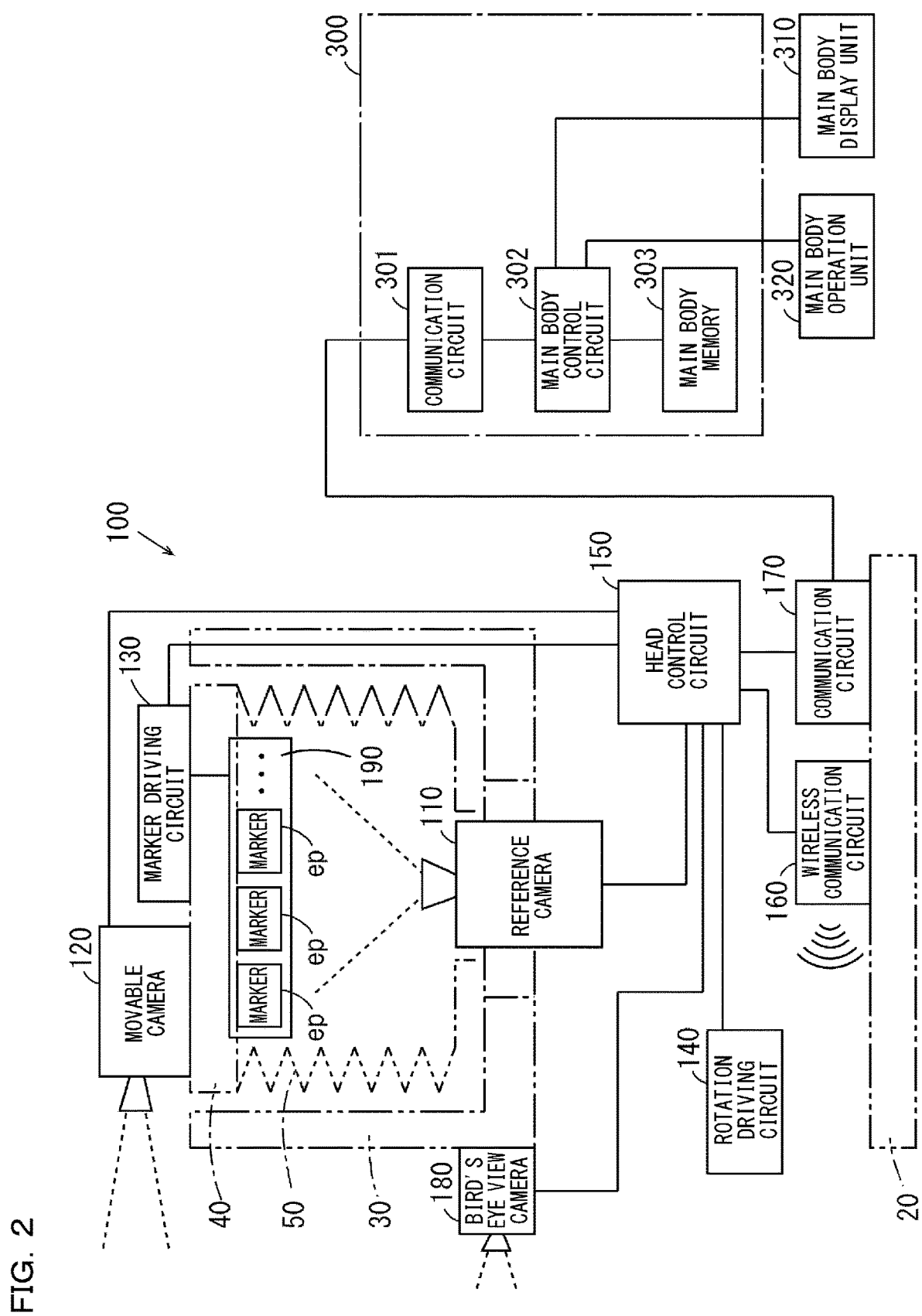
FIG. 2 is a block diagram illustrating the structures of an imaging head and a processing device.
Figure 3:
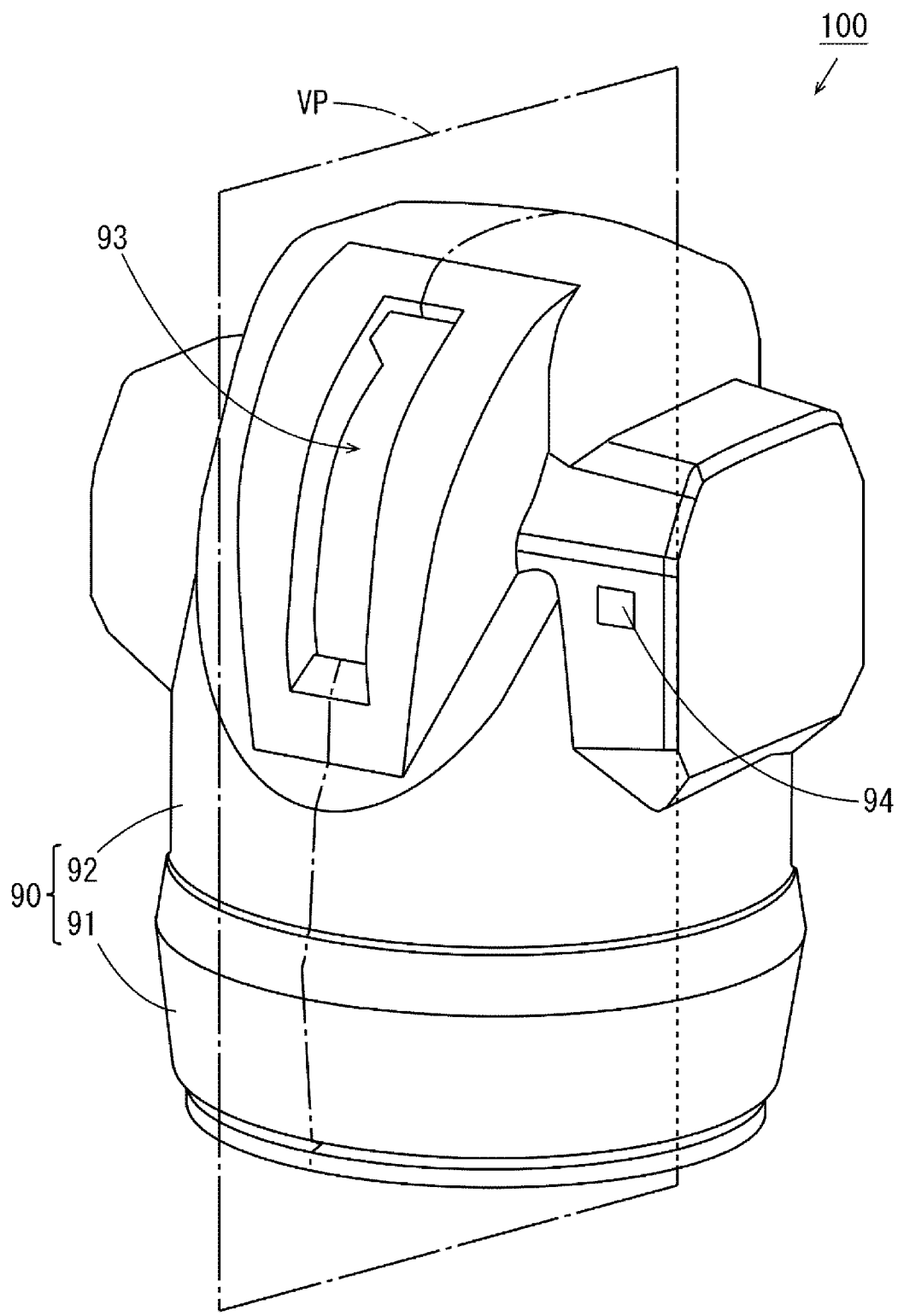
FIG. 3 is a perspective view illustrating the external appearance of the imaging head.
Figure 4:
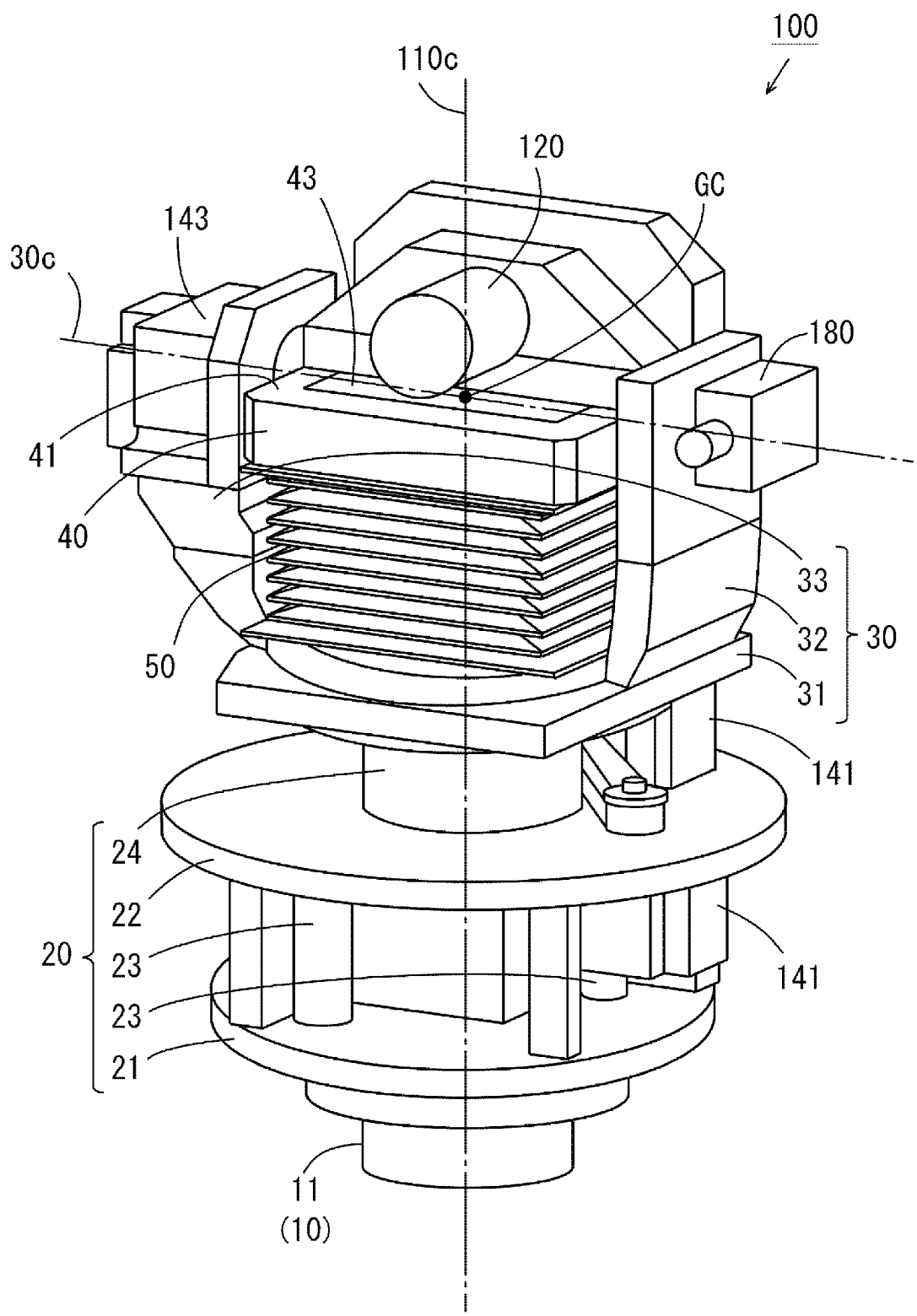
FIG. 4 is a perspective view illustrating the external appearance of the imaging head from which a casing has been removed.
Figure 5:
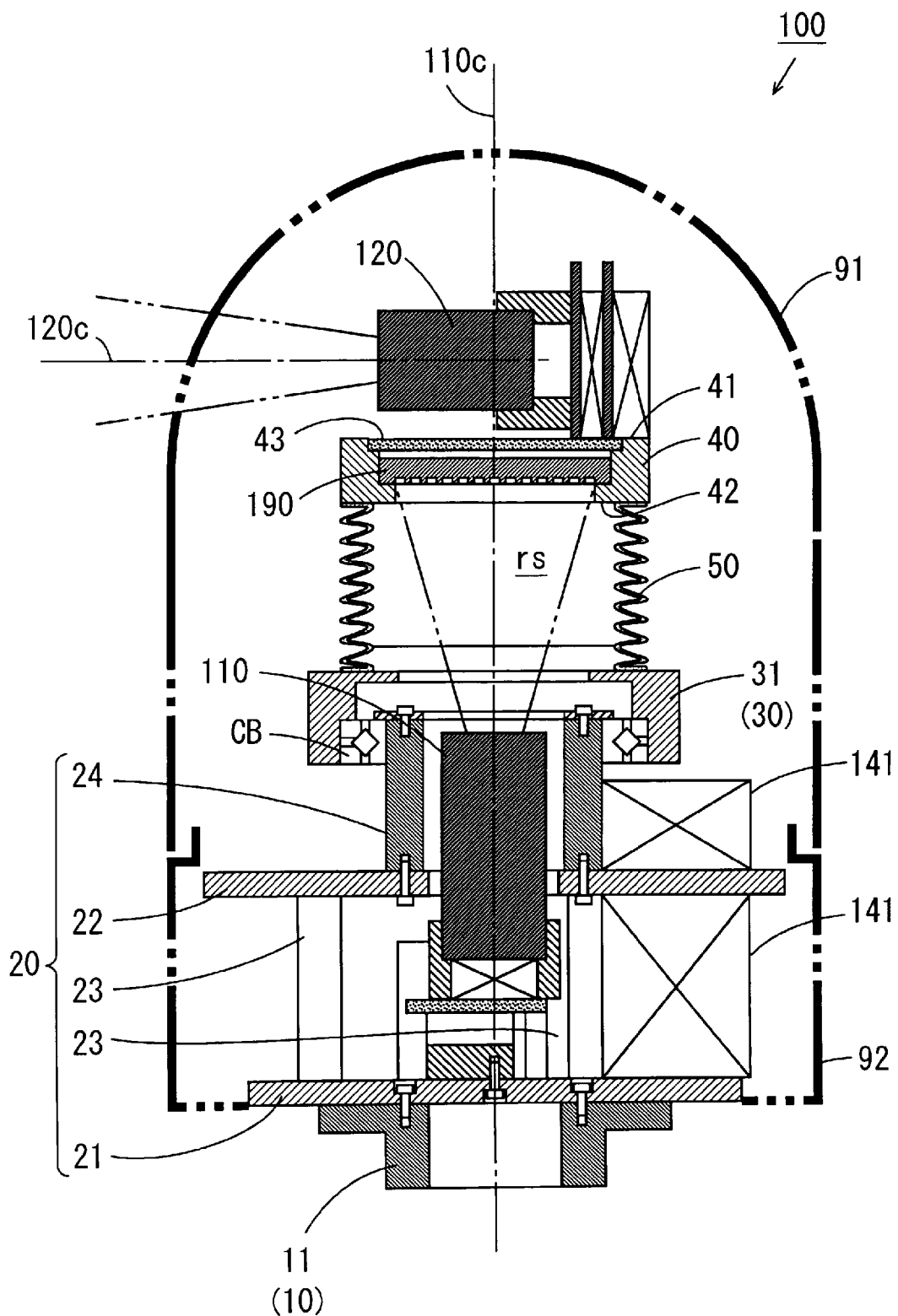
FIG. 5 is a schematic sectional view illustrating the imaging head taken in a virtual plane in FIG. 3.

FIG. 2 is a block diagram illustrating the structures of the imaging head 100 and the processing device 300. FIG. 3 is a perspective view illustrating the external appearance of the imaging head 100, FIG. 4 is a perspective view illustrating the external appearance of the imaging head 100 from which a casing 90 has been removed, and FIG. 5 is a schematic longitudinal sectional view illustrating the imaging head 100 taken in a virtual plane VP in FIG. 3.

First, the structure of the imaging head 100 will be described. As illustrated in FIG. 2, the imaging head 100 includes a reference camera 110, the movable camera 120, a marker driving circuit 130, a rotation driving circuit 140, a head control circuit 150, a wireless communication circuit 160, a communication circuit 170, a bird's eye view camera 180, and the reference member 190 as electric components. These components are accommodated in the casing 90 illustrated in FIG. 3 in the state in which they are supported by one of a fixing and coupling section 20, a supporting member 30, and a movable member 40 indicated by dot-dot-dash lines in FIG. 2.

As illustrated in FIG. 3, the casing 90 includes a lower casing 91 and an upper casing 92. As illustrated in FIG. 3 and FIG. 5, the lower casing 91 is substantially cylindrical and extends upward a certain distance from the lower end part of the imaging head 100. The upper casing 92 is provided above the lower casing 91. The upper casing 92 is substantially bell-shaped and provided rotatably together with the supporting member 30 (FIG. 4), which will be described below, in a horizontal plane.

As illustrated in FIG. 3, a slit 93 extending in an up-down direction is formed in a part of the upper casing 92. The slit 93 guides the imaging visual field of the movable camera 120 to the outside of the casing 90. In addition, a window 94 for the bird's eye view camera is formed in the upper casing 92. The window 94 for the bird's eye, view camera guides the imaging visual field of the bird's eye view camera 180 to the outside of the casing 90.

As illustrated in FIG. 4 and FIG. 5, the fixing and coupling section 20 includes the lower fixing plate 21, an upper fixing plate 22, a plurality of (for example, four) columns 23, and the hollow supporting shaft 24. The lower fixing plate 21 is disc-shaped and fixed to the upper surface of the fixing section 11 of the reference stand 10 with screws. The upper fixing plate 22 is provided above the lower fixing plate 21 via the plurality of columns 23. The upper fixing plate 22 is disc-shaped as the lower fixing plate 21. A circular opening is formed at the center of the upper fixing plate 22. The hollow supporting shaft 24 is fixed to the upper surface of the upper fixing plate 22 with screws so as to surround the opening at the center of the upper fixing plate 22. The lower casing 91 in FIG. 3 is attached to one of members that constitute the fixing and coupling section 20.

In the fixing and coupling section 20, the space between the lower fixing plate 21 and the upper fixing plate 22 is provided with various types of substrates on which the rotation driving circuit 140, the head control circuit 150, the wireless communication circuit 160, and the communication circuit 170 in FIG. 2 are mounted. In addition, on the lower fixing plate 21, the reference camera 110 is provided so as to extend from the lower fixing plate 21 to the inside of the hollow supporting shaft 24 through the opening of the upper fixing plate 22 as illustrated in FIG. 5. In this state, the imaging visual field of the reference camera 110 faces upward. In the embodiment, an optical axis 110c of the optical system of the reference camera 110 is aligned with the center axis of the hollow supporting shaft 24.

On the lower fixing plate 21 and the upper fixing plate 22, a horizontal rotation mechanism 141 is provided in addition to various types of substrates and the reference camera 110 described above. The horizontal rotation mechanism 141 is used to rotate the supporting member 30, which will be described later, about the center axis of the hollow supporting shaft 24 (in a plane parallel with the upper surface of the reference stand 10). The horizontal rotation mechanism 141 includes, for example, a motor and various types of power transmission members.

As illustrated in FIG. 4, the supporting member 30 is provided on the hollow supporting shaft 24 of the fixing and coupling section 20. The supporting member 30 includes the rotation base 31 and a pair of supporting frames 32 and 33. A rotation base 31 has an opening at the center thereof and is mounted to the upper end part of the hollow supporting shaft 24 via a cross roller bearing CB (FIG. 5) so that the supporting member 30 is rotatable about the center axis of the hollow supporting shaft 24. The upper casing 92 in FIG. 3 is mounted to one of the members that constitute the supporting member 30. When the supporting member 30 rotates with respect to the hollow supporting shaft 24, the upper casing 92 rotates together with the supporting member 30 relatives to the lower casing 91.

The pair of supporting frames 32 and 33 is formed so as to extend upward from one side and the other side of the rotation base 31 while facing each other. Between the pair of supporting frames 32 and 33, the movable member 40 is provided a predetermined distance apart from the rotation base 31.

The movable member 40 is supported by the supporting frames 32 and 33 so as to be rotatable (tiltable with respect to the horizontal plane) about a rotational axis 30c passing through the portions of the pair of supporting frames 32 and 33 facing each other. In the embodiment, the rotational axis 30c is orthogonal to the optical axis 110c of the reference camera 110 (FIG. 5) and the center axis of the hollow supporting shaft 24.

In the vicinity of the upper end part of the one supporting frame 32, the bird's eye view camera 180 is mounted in a portion positioned on the rotational axis 30c on a side opposite to the movable member 40. In the vicinity of the upper end part of the other supporting frame 33, a tilt rotation mechanism 143 is mounted in a portion positioned on the rotational axis 30c on a side opposite to the movable member 40. The tilt rotation mechanism 143 includes, for example, a motor and various types of power transmission members. The tilt rotation mechanism 143 rotates the movable member 40 about the rotational axis 30c. It should be noted here that the range in which the tilt rotation mechanism 143 can rotate the movable member 40 is limited to, for example, 30 degrees or so.

The movable member 40 is formed in a substantially square short cylinder and has an upper surface 41 and a lower surface 42. The movable camera 120 and various types of substrates that accompany the movable camera 120 are fixed to the movable member 40. In this state, an optical axis 120c (FIG. 5) of the optical system of the movable camera 120 is parallel with the upper surface 41 of the movable member 40.

A substrate 43 on which the marker driving circuit 130 in FIG. 2 is mounted is provided in the upper end part of the movable member 40 so as to close the opening at the center thereof.

Figure 6A:
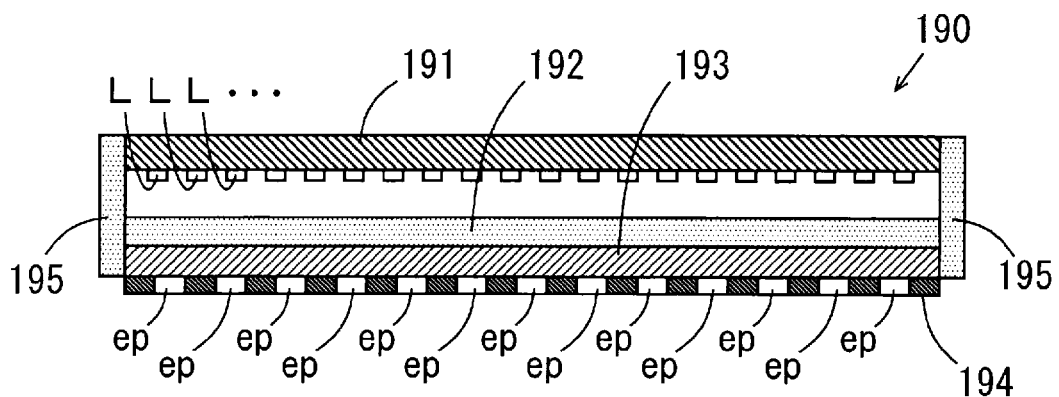
FIG. 6A is a schematic longitudinal sectional view illustrating a reference member in FIG. 5.

As illustrated in FIG. 5, the reference member 190 having the plurality of markers ep (FIG. 2) is provided inside the movable member 40. FIG. 6A is a schematic longitudinal sectional view illustrating the reference member 190 in FIG. 5 and FIG. 6B is a bottom view illustrating the reference member 190.

Figure 6B:
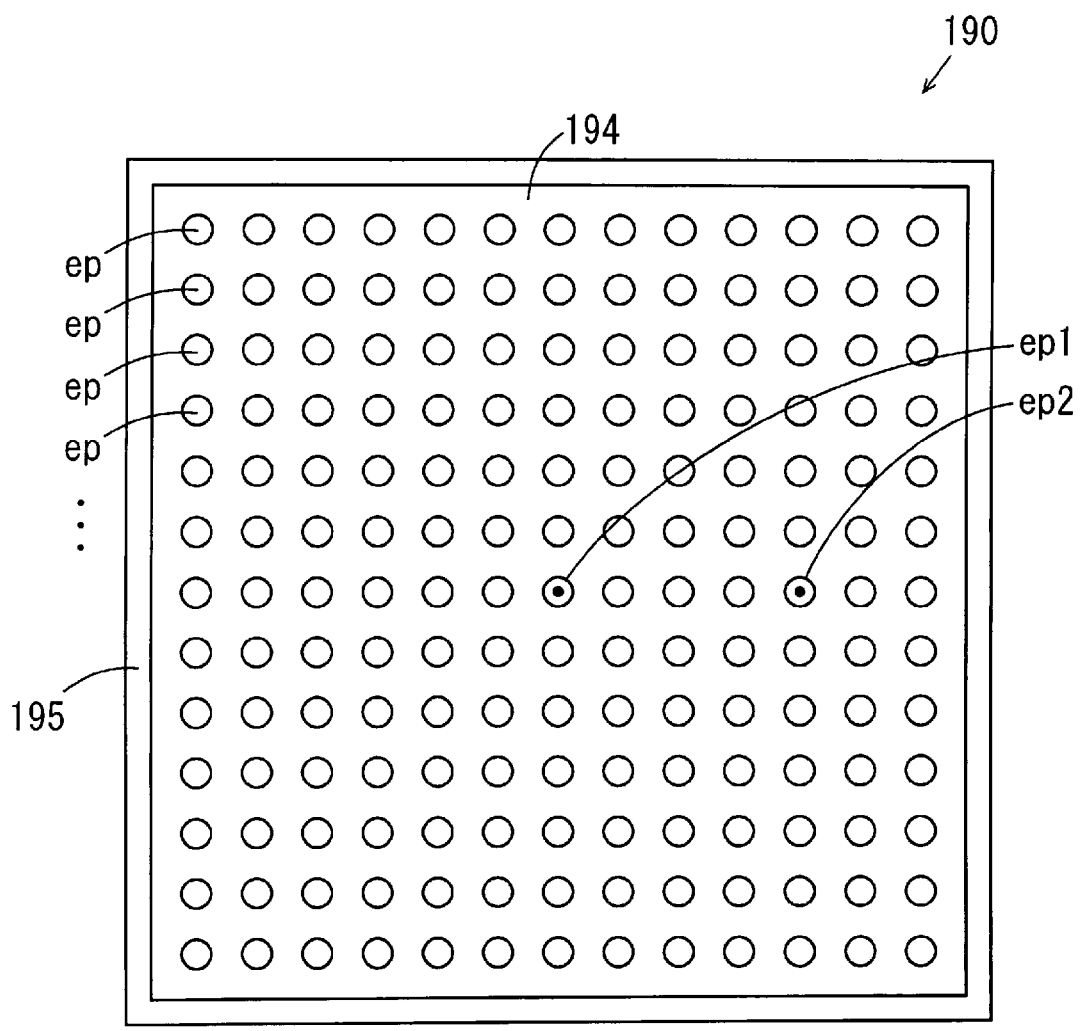
FIG. 6B is a bottom view illustrating the reference member.

As illustrated in FIGS. 6A and 6B, the reference member 190 includes a light emitting substrate 191, a diffusion plate 192, a glass plate 193, and a diffuse reflection sheet 195. The light emitting substrate 191, the diffusion plate 192, and the glass plate 193 are laminated in this order from above to below. The diffuse reflection sheet 195 is provided so as to surround the outer periphery part of this laminated body.

A plurality of light emitting elements L is mounted on the entire lower surface of the light emitting substrate 191. The light emitting elements L are, for example, infrared LEDs (light emitting diodes). As the light emitting elements L, LEDs emitting other wavelengths may be used instead of infrared LEDs or other types of light emitting elements such as filaments may be used. The marker driving circuit 130 drives the plurality of light emitting elements L on the light emitting substrate 191. This causes the plurality of light emitting elements L to emit light.

The diffusion plate 192 is a plate member made of, for example, resin and transmits light emitted from the plurality of light emitting elements L downward while diffusing the light. The diffuse reflection sheet 195 is a strip-shaped sheet member made of, for example, resin and reflects the light from the plurality of light emitting elements L toward the side (outside) of the reference member 190 inward while diffusing the light.

The glass plate 193 is a plate member made of, for example, quartz glass or soda glass. The lower surface of the glass plate 193 is provided with the mask 194 having a plurality of circular openings. The mask 194 is a chrome mask formed on the lower surface of, for example, the glass plate 193 by a sputtering method or a vapor depositing method.

In the structure described above, the light emitted from the plurality of light emitting elements L and diffused by the diffusion plate 192 and the diffuse reflection sheet 195 is released downward of the reference member 190 through the glass plate 193 and the plurality of circular openings of the mask 194. In this way, the plurality of self-emission markers ep corresponding to the plurality of circular openings, respectively, is formed.

In the embodiment, as illustrated in FIG. 6B, the plurality of markers ep is arranged at regular intervals in a matrix on the lower surface (plane) of the reference member 190. Of the plurality of markers ep, the marker ep placed at the center and the marker ep spaced apart a predetermined distance from the marker ep at the center are denoted by identification marks (points in this example) to identify these two markers from the other markers ep. These identification marks are formed by a part of the mask 194. In the following description, to distinguish these two markers ep denoted by the identification marks from the plurality of markers ep, the center marker ep having the identification mark is referred to as a first marker ep1. In addition, the other marker ep having the identification mark is referred to as a second marker ep2.

In the structure described above, the reference member 190 is attached to the movable member 40 so that the plurality of markers ep facing downward is positioned within the range of the imaging visual field of the reference camera 110. In addition, the reference member 190 is attached to the movable member 40 so that the first marker ep1 is positioned on the optical axis 110c when the upper surface 41 and the lower surface 42 of the movable member 40 are orthogonal to the direction of the optical axis 110c of the reference camera 110.

When the supporting member 30 rotates on the fixing and coupling section 20 and when the movable member 40 rotates about the rotational axis 30c, the image of the plurality of markers ep obtained when the reference camera 110 captures the reference member 190 are changed.

Figure 7A:
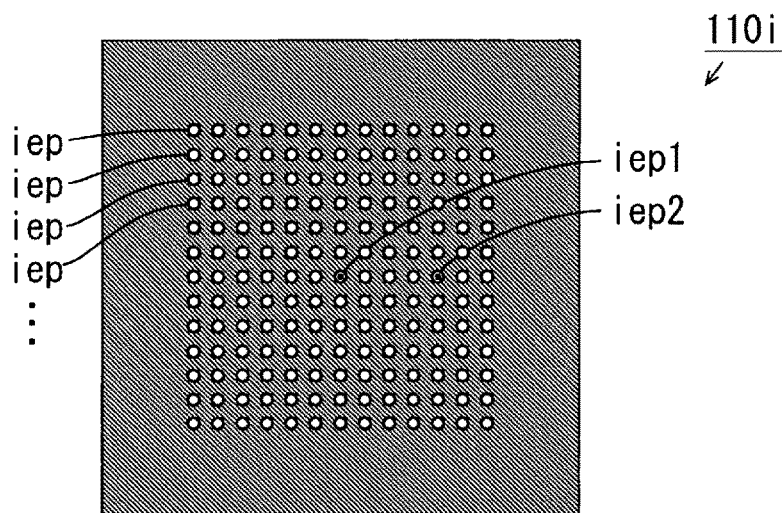
FIGS. 7A to 7C illustrate examples of images of a plurality of markers obtained by capturing the reference member using a reference camera.
Figure 7B:
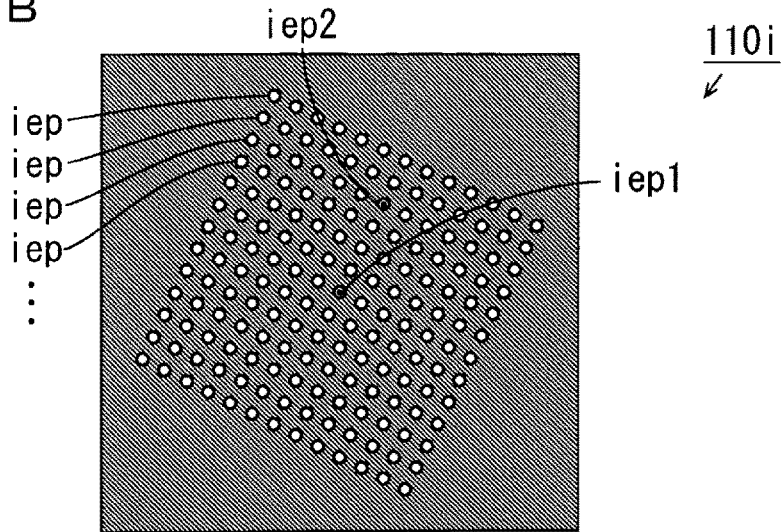
Figure 7C:
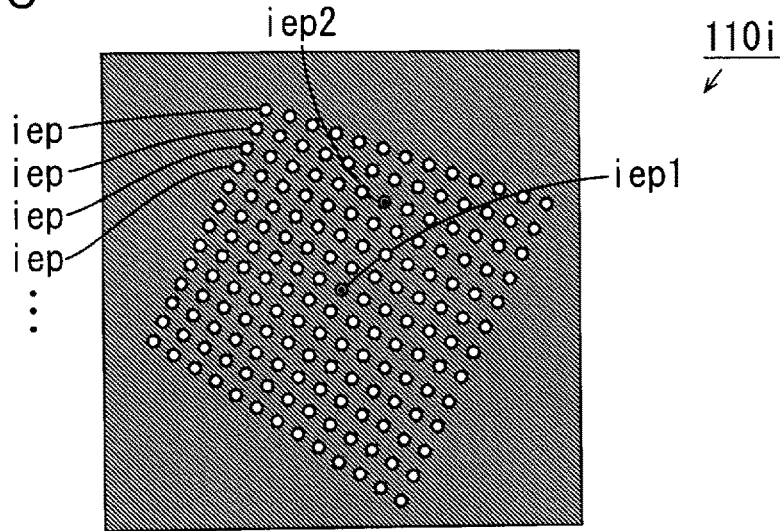

FIGS. 7A to 7C illustrate examples of the images of the plurality of markers ep obtained when the reference camera 110 captures the reference member 190. Since light is released from the plurality of markers ep in FIG. 6B, the images corresponding to the plurality of markers ep appear in the image of the reference member 190 captured by the imaging head 100.

For example, when the supporting member 30 and the movable member 40 are held in their predetermined reference postures, an image 110i illustrated in FIG. 7A is assumed to be obtained. In the reference postures, the lower surface of the reference member 190 is orthogonal to the optical axis 110c of the reference camera 110 and held horizontally. In the image 110i in FIG. 7A, marker images iep corresponding to the plurality of markers ep, respectively, are arranged in a matrix as in the plurality of actual markers ep in FIG. 6B. In addition, the marker image iep1 corresponding to the first marker ep1 in FIG. 6B is illustrated in the central part of the image corresponding to the center of the visual field of the reference camera 110. In addition, a marker image iep2 corresponding to the second marker ep2 in FIG. 6B is illustrated in a position spaced apart a predetermined distance from the marker image iep1.

When the supporting member 30 rotates from the reference posture, the distances between the plurality of markers ep and the reference camera 110 do not change significantly. In this rotation, as illustrated in FIG. 7B, the plurality of marker images iep rotate about the central part of the image. In this case, the rotation angle of the supporting member 30 from the reference posture can be obtained based on the positional relationship between the two marker images iep1 and iep2.

When the movable member 40 rotates from the reference posture, the distances between the plurality of markers ep and the reference camera 110 change individually. For example, the distances between parts of the plurality of markers ep and the reference camera 110 become smaller and the distances between other parts of the plurality of markers ep and the reference camera 110 become larger. Accordingly, when, for example, the movable member 40 rotates from the reference posture in the state in which the supporting member 30 is held in the rotation position corresponding to the image 110i in FIG. 7B, the arrangement of the plurality of marker images iep is distorted as illustrated in FIG. 7C. In this case, the rotation angle of the movable member 40 from the reference posture can be obtained based on the positional relationship of all marker images iep including the two marker images iep1 and iep2. It should be noted here that the rotatable angle range of the movable member 40 is relatively small (approximately 30 degrees) as described above. Therefore, even when the movable member 40 rotates, the positional relationship between the two marker images iep1 and iep2 does not change significantly.

As described above, the movable camera 120 and the reference member 190 are integrally fixed to the movable member 40. Accordingly, the position and the posture of the movable camera 120 with respect to the reference camera 110 can be calculated based on the image data (referred to below as the reference image data) obtained by capturing the plurality of markers ep of the reference member 190 using the reference camera 110.

Between the movable member 40 and the rotation base 31, a bellows 50 is provided to spatially blocks an imaging space rs (FIG. 5) including the imaging visual field of the reference camera 110 from the reference camera 110 to the reference member 190, from the outside of the imaging space rs.

The upper end part of the bellows 50 is coupled to the lower surface 42 of the movable member 40 and the lower end part of the bellows 50 is coupled to the upper surface of the rotation base 31. Accordingly, when the supporting member 30 rotates in the horizontal plane, the bellows 50 also rotates together with the supporting member 30.

In addition, the bellows 50 in this example is formed in a substantially square column and, when the tilt rotation mechanism 143 rotates the movable member 40, deformed following the rotation, thereby maintaining the optical and spatial block state of the imaging space rs. In addition, when the bellows 50 is deformed following the rotation of the movable member 40, the bellows 50 is provided so as not to interfere with the imaging visual field of the reference camera 110.

This structure prevents light from entering the imaging space rs from the outside of the imaging space rs. In addition, even when a motor or the like is heated around the imaging space rs, the generated heat is prevented from entering the imaging space rs. This prevents the atmosphere of the imaging space rs from fluctuating. Accordingly, since the plurality of markers ep is captured with high accuracy, the position and the posture of the movable camera 120 with respect to the reference camera 110 can be calculated with high accuracy.

In addition, in the structure described above, since the inner space of the bellows 50 is spatially blocked from the outer space, the atmosphere of the inner space of the bellows 50 becomes stable. Accordingly, the heat source provided outside the bellows 50 can be forcibly cooled by a fan or the like.

It should be noted here that the inner surface of the bellows 50 that faces the imaging space rs is preferably configured by a color or material that has a small light reflectivity and absorbs light. For example, the color of the inner surface of the bellows 50 may be black. Alternatively, the inner surface of the bellows 50 may be configured by a nonreflective material that does not reflect light. Alternatively, the inner surface of the bellows 50 may be coated with a nonreflective material. This prevents light released by the plurality of markers ep from being irregularly reflected by the inner surface of the bellows 50. Accordingly, the plurality of markers ep can be captured with high accuracy.

In the imaging head 100, as illustrated in FIG. 4, the movable camera 120 is preferably provided so that the barycenter of the movable camera 120 approaches an intersection point GC between the optical axis 110c of the reference camera 110 and the rotational axis 30c. In this case, as the barycenter of the movable camera 120 is closer to the intersection point GC, the rotation of the supporting member 30 about the optical axis 110c becomes more stable and the rotation of the movable member 40 about the rotational axis 30c becomes more stable. In addition, the driving force required to rotate the supporting member 30 and the movable member 40 can be reduced. This reduces the load applied to the driving units such as the motor.

As illustrated in FIG. 4, the bird's eye view camera 180 is provided on the supporting frame 32 so that the imaging visual field thereof is oriented in the same or substantially the same direction as the imaging visual field of the movable camera 120. The angle of view of the bird's eye view camera 180 is larger than the angles of view of the reference camera 110 and the movable camera 120. Accordingly, the imaging visual field of the bird's eye view camera 180 is larger than the imaging visual fields of the reference camera 110 and the movable camera 120. It should be noted here that the angle of view of the movable camera 120 is set, for example, so as to cover a circular area with a diameter of 15 cm or so at a position 1.5 meters apart from the movable camera 120.

In tracking processing, which will be described later, the bird's eye view camera 180 is used to capture the probe 200 over a wide range. Even when, for example, the probe 200 deviates from the imaging visual field of the movable camera 120 due to the movement of the probe 200 in this case, by capturing the probe 200 using the bird's eye view camera 180, the approximate position of the probe 200 can be specified based on the image data (referred to below as bird's eye view image data) by the capturing. The position and posture of the movable camera 120 are adjusted based on the specified position so that the probe 200 is positioned in the imaging visual field of the movable camera 120.

As illustrated in FIG. 2, the reference camera 110, the movable camera 120, the marker driving circuit 130, the rotation driving circuit 140, the wireless communication circuit 160, and the communication circuit 170 are connected to the head control circuit 150. The head control circuit 150 includes a CPU (central processing unit) and a memory or a microcomputer and controls the reference camera 110, the movable camera 120, the marker driving circuit 130, and the rotation driving circuit 140.

Each of the reference camera 110, the movable camera 120, and the bird's eye view camera 180 includes a CMOS (complementary metal oxide film semiconductor) image sensor capable of detecting infrared light, as an imaging element. In addition, each of the reference camera 110, the movable camera 120, and the bird's eye view camera 180 includes a plurality of lenses (optical systems), which is not illustrated.

As described above, the pixels of the reference camera 110, the movable camera 120, and the bird's eye view camera 180 output the analog electric signals (referred to below as light-receiving signals) corresponding to the detection amount of to the head control circuit 150.

An A/D converter (analog-to-digital converter) and a FIFO (first-in first-out) memory, which are not illustrated, are mounted on the head control circuit 150. The light-receiving signals output from the reference camera 110, the movable camera 120, and the bird's eye view camera 180 are sampled by the A/D converter of the head control circuit 150 at a constant sampling period and converted into digital signals. The digital signals output from the A/D converter are accumulated in FIFO memory in sequence. The digital signals accumulated in the FIFO memory are transferred to the processing device 300 in sequence as pixel data.

The marker driving circuit 130 drives the light emitting substrate 191 in FIG. 6A under control of the head control circuit 150. This causes the plurality of light emitting elements L on the light emitting substrate 191 to emit light and the plurality of markers eq of the reference member 190 to release light. It should be noted here that this light emission timing synchronizes with the capturing timing of the reference camera 110.

The rotation driving circuit 140 drives the horizontal rotation mechanism 141 in FIG. 4 under control of the head control circuit 150. This rotates the supporting member 30 in FIG. 4 on the fixing and coupling section 20 and rotates the movable member 40 and the upper casing 92 (FIG. 3). At this time, since the movable member 40 rotates, the imaging visual field of the movable camera 120 introduced from the inside to the outside of the upper casing 92 through the slit 93 (FIG. 3) rotates in a horizontal direction on the reference stand 10 in FIG. 1.

In addition, the rotation driving circuit 140 drives the tilt rotation mechanism 143 in FIG. 4 under control of the head control circuit 150. This rotates the movable member 40 in FIG. 4 about the rotational axis 30c between the pair of supporting frames 32 and 33. At this time, the imaging visual field of the movable camera 120 that passes through the slit 93 (FIG. 3) rotates in an up-down direction along the slit 93 on the reference stand 10 in FIG. 1. The rotation of the imaging visual field of the movable camera 120 by the rotation driving circuit 140 is performed based on tracking processing, which will be described later, by the processing device 300.

The head control circuit 150 performs wireless communication with the probe 200 via the wireless communication circuit 160. In addition, the head control circuit 150 performs wired communication with the processing device 300 via the communication circuit 170 and the cable CA (FIG. 1).

As illustrated in FIG. 2, the processing device 300 includes a communication circuit 301, a main body control circuit 302, and a main body memory 303. The communication circuit 301 and the main body memory 303 are connected to the main body control circuit 302. In addition, a main body operation unit 320 and a main body display unit 310 are connected to the main body control circuit 302.

The main body memory 303 includes a ROM (read-only memory), a RAM (random access memory), and a hard disk. The main body memory 303 stores a measurement processing program and a tracking processing program, which will be described later, together with a system program. In addition, the main body memory 303 is used to process various types of data or store various types of data such as pixel data given by the imaging head 100.

The main body control circuit 302 includes a CPU. In the embodiment, the main body control circuit 302 and the main body memory 303 are achieved by a personal computer. The main body control circuit 302 generates image data based on pixel data given from the imaging head 100 via the cable CA (FIG. 1) and the communication circuit 301. The image data is a set including a plurality of pieces of pixel data.

In the embodiments, provided on the imaging head 100, reference image data, measurement image data, and bird's eye view image data corresponding to the reference camera 110, the movable camera 120, and the bird's eye view camera 180, respectively, are generated. In addition, image data corresponding to a probe camera 208, which will be described later, provided on the probe 200 is generated. The main body control circuit 302 calculates the position of the contact part 211a (FIG. 1) of the probe 200 based on the reference image data and the measurement image data.

The main body display unit 310 is configured by, for example, a liquid crystal display panel or an organic EL (electroluminescence) panel. The main body display unit 310 displays the coordinates of measurement points on the measurement target S, the measurement results of individual portions of the measurement target S, and the like under control of the main body control circuit 302. In addition, the main body display unit 310 displays a setting screen on which various settings about measurement are made.

The main body operation unit 320 includes a keyboard and a pointing device. The pointing device includes a mouse, a joystick, or the like. The main body operation unit 320 is operated by the user U.

[3] Structure of the Probe 200

Figure 8:
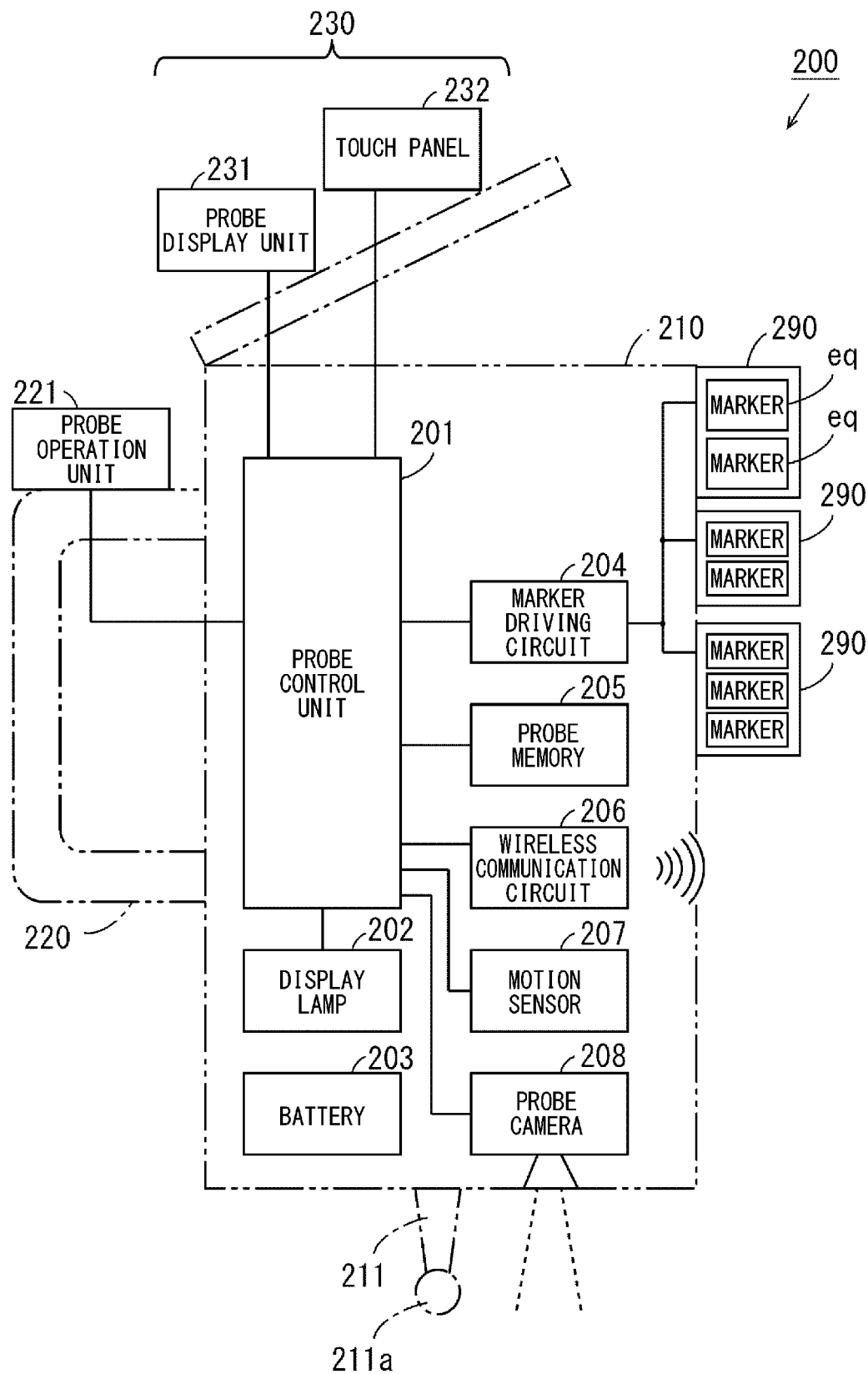
FIG. 8 is a block diagram illustrating the structure of a probe.
Figure 9:
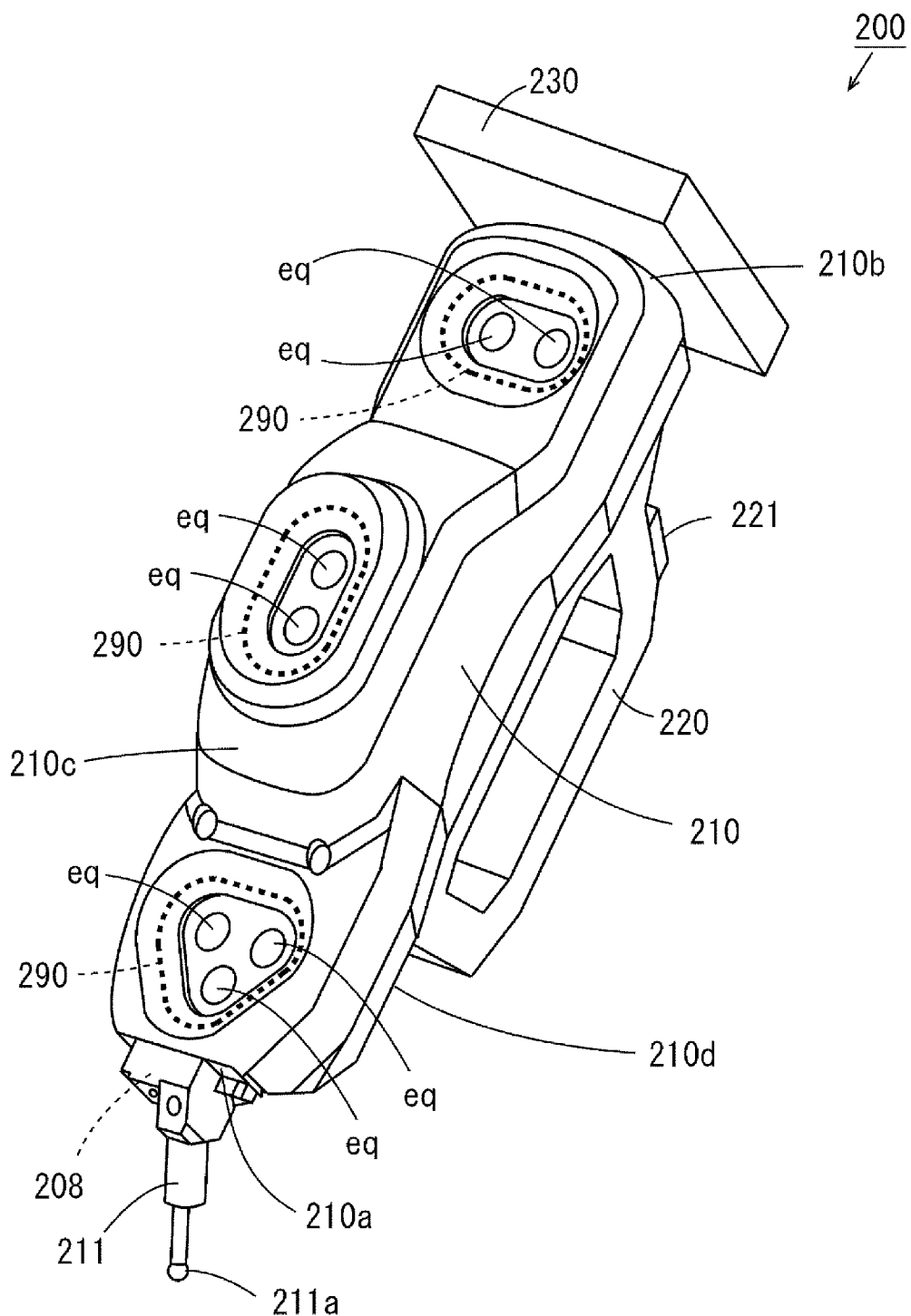
FIG. 9 is a perspective view illustrating the external appearance of the probe.

FIG. 8 is a block diagram illustrating the structure of the probe 200. FIG. 9 is a perspective view illustrating the external appearance of the probe 200. As illustrated in FIG. 8, the probe 200 includes a probe control unit 201, a display lamp 202, a battery 203, a marker driving circuit 204, a probe memory 205, a wireless communication circuit 206, a motion sensor 207, the probe camera 208, a probe operation unit 221, a touch panel display 230, and a plurality of (three in this example) target members 290 as electric components.

The battery 203 supplies electric power to other components provided in the probe 200. The probe control unit 201 includes a CPU and a memory or a microcomputer and controls the display lamp 202, the marker driving circuit 204, the probe camera 208, and the touch panel display 230. In addition, the probe control unit 201 performs various types of processings in response to the operation of the probe operation unit 221 and the touch panel display 230 by the user U.

As indicated by a dot-dot-dash line in FIG. 8, the probe 200 has a probe casing 210 that accommodates or supports the components described above and a grip part 220. The probe control unit 201, the display lamp 202, the battery 203, the marker driving circuit 204, the probe memory 205, the wireless communication circuit 206, the motion sensor 207, and the probe camera 208 are accommodated in the probe casing 210. The plurality of target members 290 is provided on an upper surface part 210c (FIG. 9), which will be described later, of the probe casing 210. The probe operation unit 221 is a button that can be pushed and provided in the grip part 220.

The touch panel display 230 includes a probe display unit 231 and a touch panel 232. The probe display unit 231 is configured by, for example, a liquid crystal display panel or an organic EL panel.

The display lamp 202 includes, for example, one or more LEDs and a light emitting section thereof is provided so as to be exposed to the outside of the probe casing 210. The display lamp 202 emits light according to the state of the probe 200 under control of the probe control unit 201.

The three target members 290 have basically the same structure as the reference member 190 in FIGS. 6A and 6B. The marker driving circuit 204 is connected to the plurality of target members 290 and drives a plurality of light emitting elements included in the target members 290 under control of the probe control unit 201.

The probe memory 205 includes a recording medium such as a non-volatile memory or a hard disk. The probe memory 205 is used to process various types of data or store various types of data such as image data given by the imaging head 100.

The motion sensor 207 detects the movement of the probe 200 when, for example, the user U moves while carrying the probe 200. For example, the motion sensor 207 detects the movement direction, the acceleration, the posture, and the like when the probe 200 moves. The probe camera 208 is, for example, a CCD (charge-coupled device) camera.

An A/D converter and a FIFO memory, which are not illustrated, are mounted in the probe control unit 201 in addition to the CPU and the memory or the microcomputer described above. Accordingly, in the probe control unit 201, signals indicating the motion of the probe 200 detected by the motion sensor 207 are converted to data of digital signal type (referred to below as motion data). In addition, the probe control unit 201 converts light-receiving signals output from pixels of the probe camera 208 to a plurality of pieces of pixel data of digital signal type. The probe control unit 201 transmits, via wireless communication, the digital motion data and the plurality of pieces of pixel data to the imaging head 100 in FIG. 2 through the wireless communication circuit 206. In this case, the motion data and the plurality of pieces of pixel data are further transferred to the processing device 300 from the imaging head 100.

As illustrated in FIG. 9, the probe casing 210 is formed so as to extend in one direction and has a front end part 210a, a rear end part 210b, the upper surface part 210c, and a bottom surface part 210d. The bottom surface part 210d is provided with the grip part 220. The grip part 220 is formed so as to extend in parallel with the probe casing 210. The probe operation unit 221 is provided in the part of the grip part 220 close to the rear end part 210b of the probe casing 210.

The rear end part 210b of the probe casing 210 is provided with the touch panel display 230. The front end part 210a is provided with a stylus 211. The stylus 211 is a rod-like member having the contact part 211a at a tip thereof. The front end part 210a further has the probe camera 208.

The upper surface part 210c of the probe casing 210 is provided with the three target members 290 arranged from the front end part 210a to the rear end part 210b. Of the three target members 290 in this example, the target member 290 closest to the front end part 210a has three markers eq. Each of the two remaining target members 290 has the two markers eq. The markers eq are self-emission markers that emit infrared light. It should be noted here that the emission timing of the plurality of markers eq synchronizes with the capturing timing of the movable camera 120 of the imaging head 100.

The user U grasps the grip part 220 so that the upper surface part 210c of the probe casing 210 faces the imaging head 100. In this state, the user U brings the contact part 211a into contact with a desired part of the measurement target S. In addition, the user U operates the probe operation unit 221 and the touch panel display 230 while visually recognizing an image displayed on the touch panel display 230.

[4] Method for Calculating the Coordinates of a Measurement Point

In the three-dimensional coordinate measuring device 1 according to the embodiment, a three-dimensional coordinate system (referred to below as the device coordinate system) having a predetermined relationship with respect to the reference camera 110 is predefined. In addition, the main body memory 303 of the processing device 300 stores the relative positional relationship of the plurality of markers ep in the reference member 190 in advance.

As described above, the reference camera 110 captures the plurality of markers ep of the reference member 190. In this case, the main body control circuit 302 in FIG. 2 calculates the coordinates of the markers ep in the device coordinate system based on the reference image data obtained by the capturing and the positional relationship of the plurality of markers ep stored in the main body memory 303. At this time, the plurality of markers ep of the reference member 190 is identified based on the first and second markers ep1 and ep2.

After that, based on the calculated coordinates of the plurality of markers ep, the main body control circuit 302 generates, as the first position/posture information, the information indicating the position and the posture of the movable camera 120 fixed to the reference member 190 in the device coordinate system.

In the three-dimensional coordinate measuring device 1 according to the embodiment, a three-dimensional coordinate system (referred to below as the movable coordinate system) having a predetermined relationship with the movable camera 120 is predefined in addition to the device coordinate system described above. In addition, the main body memory 303 of the processing device 300 stores the relative positional relationship of the plurality of markers eq of the probe 200 in advance.

As described above, the movable camera 120 captures the plurality of markers eq of the probe 200. In this case, the main body control circuit 302 in FIG. 2 calculates the coordinates of the markers eq in the movable coordinate system based on the measurement image data obtained by capturing and the positional relationship of the plurality of markers eq stored in the main body memory 303.

After that, the main body control circuit 302 generates the information indicating the position and the posture of the probe 200 as the second position/posture information based on the calculated coordinates of the plurality of markers eq.

The reference camera 110 is fixed to the reference stand 10. Therefore, the device coordinate system does not change while the measurement target S is measured. In contrast, the movable camera 120 is provided rotatably so that the imaging visual field follows the movement of the probe 200. Accordingly, the relationship between the device coordinate system and the movable coordinate system changes as the movable camera 120 rotates.

Accordingly, in the embodiment, the main body control circuit 302 generates the third position/posture information indicating the position and the posture of the probe 200 in the device coordinate system based on the first and second position/posture information. That is, the main body control circuit 302 calculates the relationship of the movable coordinate system relative to the device coordinate system based on the first position/posture information and converts the second position/posture information to information that follows the device coordinate system based on the calculated relationship. This generates the third position/posture information.

After that, the main body control circuit 302 calculates the coordinate of the measurement point indicated by the probe 200 based on the generated third position/posture information and the positional relationship between the plurality of markers eq and the contact part 211a of the probe 200.

[5] Example of Measurement

The probe operation unit 221 in FIG. 9 is depressed by the user U to calculate the coordinates of a measurement point. For example, the user U depresses the probe operation unit 221 in the state in which the contact part 211a makes contact with a desired portion of the measurement target S. In this case, the coordinates of the portion of the measurement target S in contact with the contact part 211a are calculated as the coordinates of the measurement point. The calculated coordinates of the measurement point are stored in the main body memory 303 as the measurement result and displayed on the probe display unit 231 and the main body display unit 310.

In the three-dimensional coordinate measuring device 1, the user U can set desired measurement conditions for the measurement target S by operating the main body operation unit 320 in FIG. 2 or the touch panel display 230 in FIG. 8.

Specifically, the user U selects the geometric element and the measurement item of the measurement target S. The geometric element represents the geometric shape of the portion of the measurement target S to be measured. The geometric shape is a point, a straight line, a plane, a circle, a cylinder, a sphere, or the like. In addition, the measurement item represents the type of a physical quantity of the measurement target S to be measured, such as a distance, an angle, or flatness.

After selecting the geometric element and the measurement item, the user U instructs one or more measurement points of the selected geometric element using the probe 200. This generates information (referred to below as element specifying information) indicating the selected geometric element specified by one or more measurement points on the measurement target S in the device coordinate system. After that, the value of the measurement item selected for the generated element specifying information is calculated.

For example, when the user U wants to measure the distance between a first surface and a second surface (of the measurement target S) that are parallel with each other and positioned opposite to each other, the user U selects geometric elements "plane 1" and "plane 2". In addition, the user U selects a measurement item "distance".

In this case, to specify the plane (first surface) on the measurement target S corresponding to the geometric element "plane 1", the user U instructs a plurality of points (three or more points in this example) on the first surface of the measurement target S as measurement points using the probe 200. This generates the element specifying information corresponding to the geometric element "plane 1".

In addition, to specify the plane (second surface) on the measurement target S corresponding to the geometric element "plane 2", the user U instructs a plurality of points (three or more points in this example) on the second surface of the measurement target S as measurement points using the probe 200. This generates the element specifying information corresponding to the geometric element "plane 2".

After that, the distance between the first surface and the second surface of the measurement target S corresponding to the measurement item "distance" is calculated based on the element specifying information corresponding to the geometric elements "plane 1" and the element specifying information corresponding to "plane 2".

The calculated measurement result is stored in the main body memory 303 and displayed on the probe display unit 231 and the main body display unit 310.

[6] Measurement Processing

Figure 10:
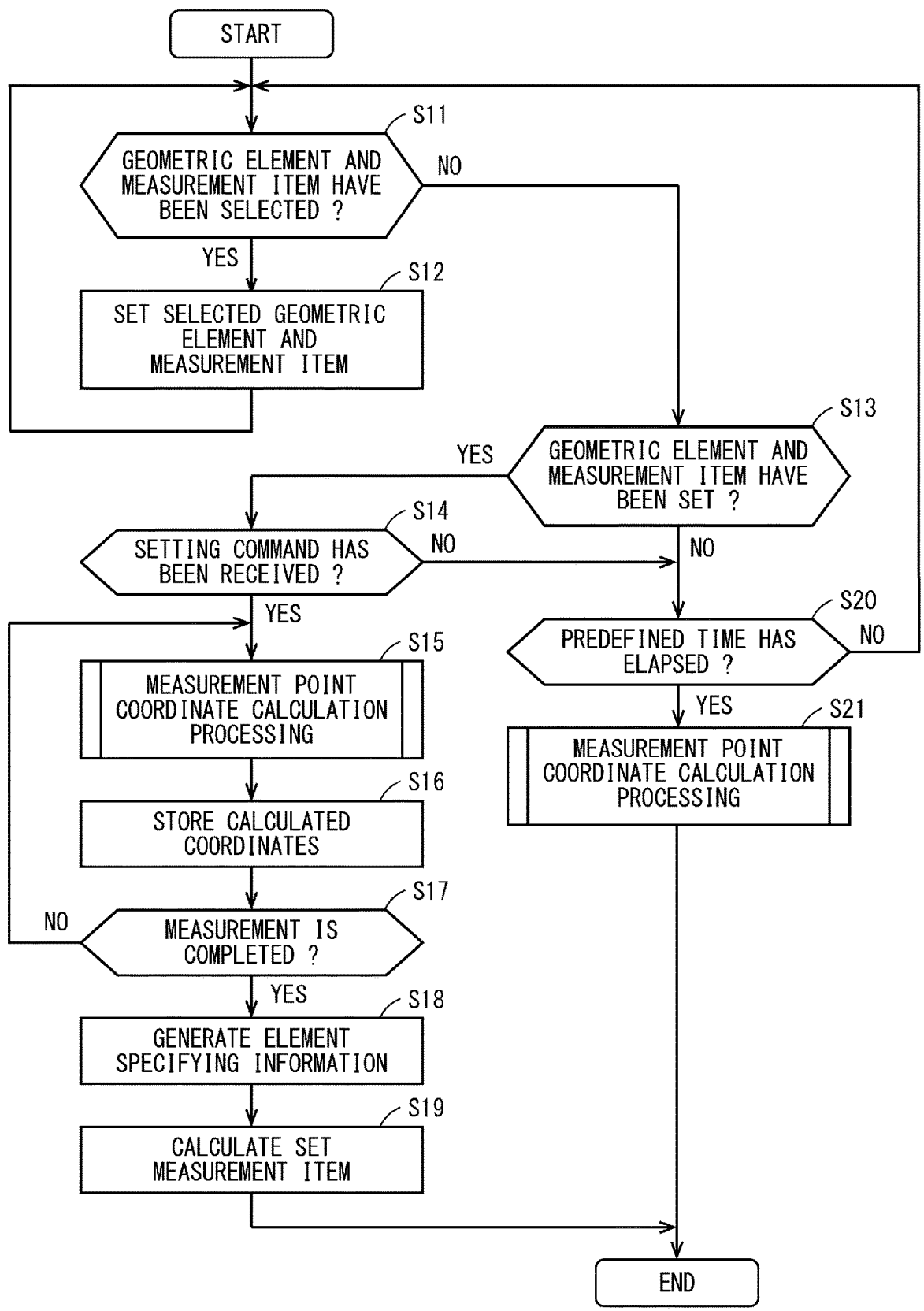
FIG. 10 is a flowchart illustrating a flow of measurement processing by a main body control circuit in FIG. 2.

FIG. 10 is a flowchart illustrating a flow of measurement processing by the main body control circuit 302 in FIG. 2. The measurement processing in FIG. 10 is repeated at a predetermined period by causing the CPU of the main body control circuit 302 in FIG. 2 to execute the measurement processing program stored in the main body memory 303. In addition, at the start of the measurement processing, the timer included in the main control circuit 302 is reset and then started.

First, the main control circuit 302 decides whether the geometric element and the measurement item have been selected based on the presence or absence of the operation of the main body operation unit 320 in FIG. 2 or the touch panel display 230 in FIG. 8 by the user U (step S11).

When the geometric element and the measurement item have been selected, the main body control circuit 302 sets the selected geometric element and the measurement item as the measurement conditions by storing the geometric element and the measurement item in the main body memory 303 in FIG. 2 (step S12). After that, the main body control circuit 302 returns to the processing in step S11.

When the geometric element and the measurement item have not been selected in step S11, the main body control circuit 302 decides whether the geometric element and the measurement item have been set (step S13). When the geometric element and the measurement item have been set, the main body control circuit 302 decides whether a command to start the measurement of the measurement target S has been received (step S14). This decision is performed based on, for example, the presence or absence of the operation of the main body operation unit 320 or the touch panel display 230 by the user U.

When the command to start the measurement of the measurement target S has been received, the main body control circuit 302 performs measurement point coordinate calculation processing (step S15). Details on the measurement point coordinate calculation processing will be described later. This processing causes the main body control circuit 302 to calculate the coordinates of the measurement points that specify the selected geometric element based on the operation of the probe 200 by the user.

The main body control circuit 302 stores, in the main body memory 303, the coordinates of one or more measurement points calculated by the measurement point coordinate calculation processing in step S15 (step S16).

Next, the main body control circuit 302 decides whether a command to end the measurement of the measurement target S has been received (step S17). This decision is performed based on, for example, the presence or absence of the operation of the main body operation unit 320 or the touch panel display 230 by the user U.

When the command to end the measurement has not been received, the main body control circuit 302 returns to the processing in step S15 described above. In contrast, when the command to end the measurement has been received, the main body control circuit 302 generates the element specifying information for the geometric element set from the coordinates of one or more measurement points stored in the main body memory 303 in the processing in step S16 immediately before (Step S18).

After that, the main body control circuit 302 calculates the value of the measurement item set based on the element specifying information generated in the processing in step S18 (step S19) and ends the measurement processing. When a plurality of geometric elements (for example, two planes or the like) is set at the decision in step S13, the processing in steps S14 to S18 described above is performed for each of the set geometric elements.

When the geometric element and the measurement item have not been set in step S13 and when the command to start the measurement of the measurement target S has not been received in step S14, the main body control circuit 302 decides whether a predetermined time has elapsed after the start of the measurement processing based on the measurement time by the built-in timer (step S20).

When the predetermined time has not elapsed, the main body control circuit 302 returns to the processing in step S11. In contrast, when the predetermined time has elapsed, the main body control circuit 302 performs the measurement point coordinate calculation processing, which will be described later, as in the processing in step S15 (step S21). After that, the main body control circuit 302 ends the measurement processing.

It should be noted here that the processing in step S21 is performed, for example, to decide whether the probe 200 is present within the imaging visual field of the movable camera 120 or the bird's eye view camera 180 in tracking processing, which will be described later.

Figure 11:
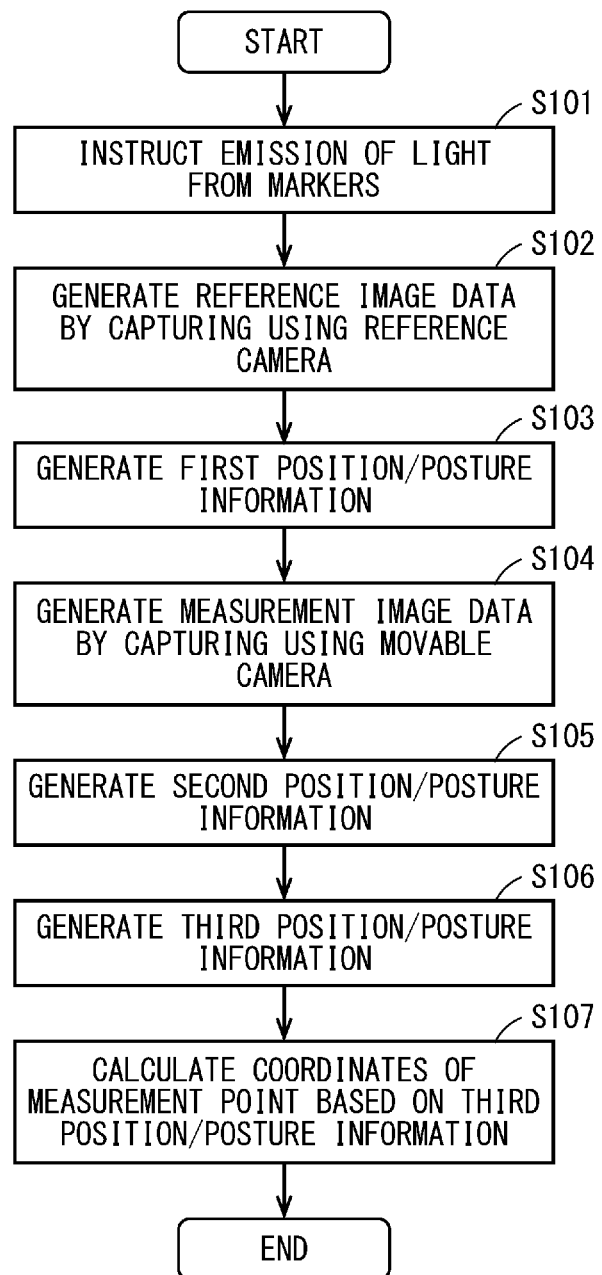
FIG. 11 is a flowchart illustrating a flow of measurement point coordinate calculation processing.

FIG. 11 is a flowchart illustrating a flow of measurement point coordinate calculation processing. First, the main body control circuit 302 instructs the probe control unit 201 of the probe 200 to emit light from the plurality of markers eq (FIG. 9) and instructs the head control circuit 150 of the imaging head 100 to emit light from the plurality of markers ep (FIG. 6B) of the reference member 190 (step S101).

Next, the main body control circuit 302 generates reference image data by causing the head control circuit 150 to capture the plurality of markers ep of the reference member 190 using the reference camera 110 (step S102). In addition, the main body control circuit 302 generates the first position/posture information indicating the position and the posture of the movable camera 120 in the device coordinate system based on the generated reference image data (step S103).

Next, the main body control circuit 302 generates measurement image data by capturing the plurality of markers eq of the probe 200 using the movable camera 120 (step S104). In addition, the main body control circuit 302 generates the second position/posture information indicating the position and the posture of the probe 200 in the movable coordinate system based on the generated measurement image data (step S105).

After that, based on the first and second position/posture information, the main body control circuit 302 generates the third position/posture information indicating the position and the posture of the probe 200 in the device coordinate system (step S106). In addition, the main body control circuit 302 calculates the coordinates of the measurement point indicated by the probe 200 based on the generated third position/posture information.

It should be noted here that the processing in step S102 and step S103 described above and the processing in step S104 and step S105 may be performed in the reverse order.

According to the measurement processing described above, the user U can easily measure a desired physical quantity of the measurement target S by selecting a desired geometric element and a desired measurement item from the plurality of predetermined geometric elements and the plurality of predetermined measurement items.

[7] Tracking Processing

Figure 12:
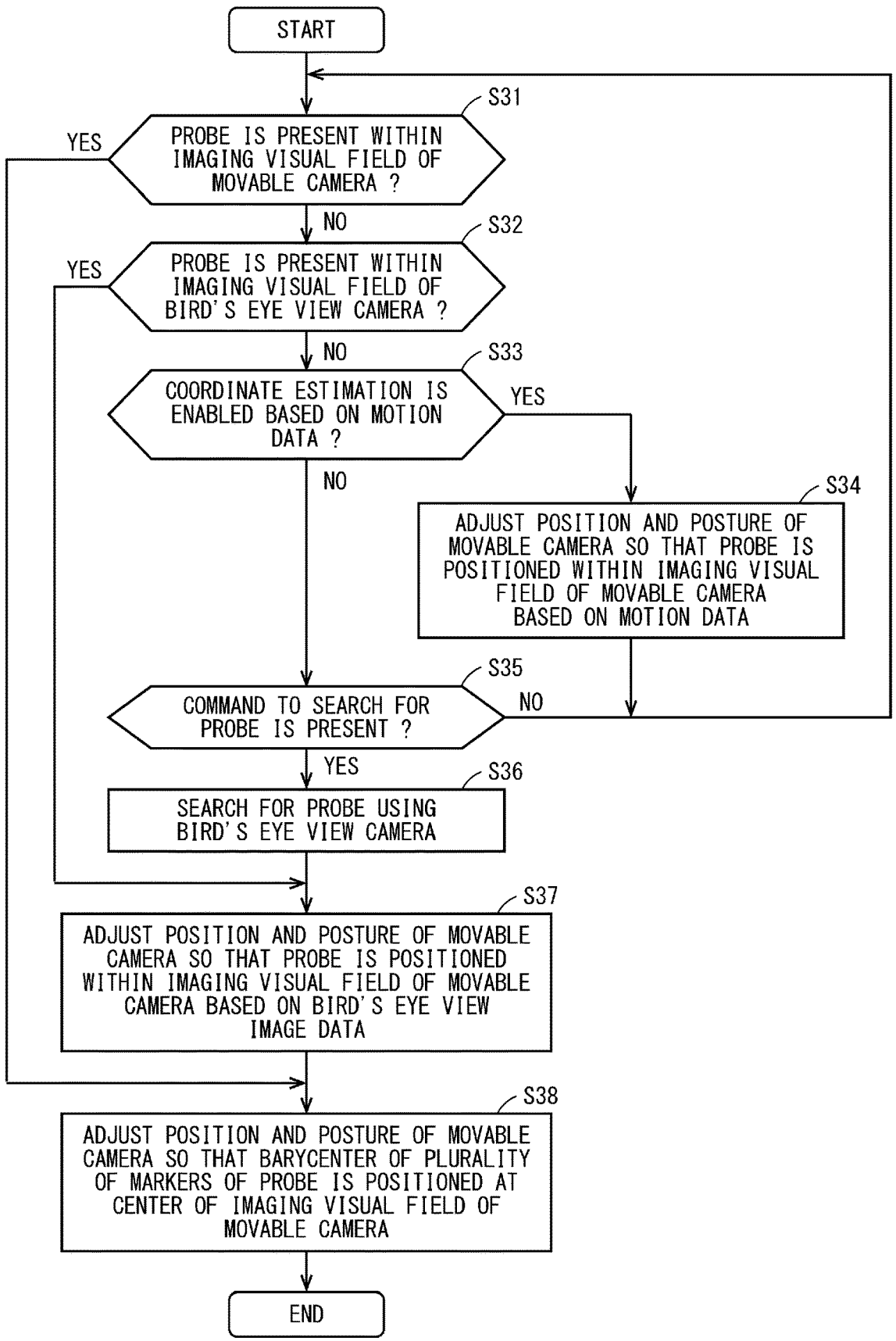
FIG. 12 is a flowchart illustrating a flow of tracking processing by the main body control circuit in FIG. 2.

FIG. 12 is a flowchart illustrating a flow of tracking processing by the main body control circuit 302 in FIG. 2. The tracking processing in FIG. 12 is repeated at a predetermined period by causing the CPU of the main body control circuit 302 in FIG. 2 to execute the tracking processing program stored in the main body memory 303.

First, the main body control circuit 302 decides whether the probe 200 is present within the imaging visual field of the movable camera 120 (step S31). This decision is performed by deciding whether the measurement image data generated during the processing in step S15 and step S21 in the measurement processing includes the image data corresponding to the plurality of markers eq.

When the probe 200 is present within the imaging visual field of the movable camera 120, the main body control circuit 302 proceeds to the processing in step S38, which will be described later. In contrast, when the probe 200 is not present in the imaging visual field of the movable camera 120, the main body control circuit 302 decides whether the probe 200 is in the imaging visual field of the bird's eye view camera 180 (step S32). This decision is performed by deciding whether the bird's eye view image data generated during the processing in step S15 and step S21 in the measurement processing described above includes the image data corresponding to the plurality of markers eq.

When the probe 200 is present within the imaging visual field of the bird's eye view camera 180, the main body control circuit 302 proceeds to the processing in step S37, which will be described later. In contrast, when the probe 200 is not present within the imaging visual field of the movable camera 120, the main body control circuit 302 decides whether the coordinate estimation of the probe 200 is enabled based on the motion data transferred from the probe 200 (step S33). This decision is performed based on, for example, whether the motion data indicates an abnormal value or whether the value indicated by the motion data is zero. When the motion data indicates an abnormal value or when the motion data is zero, the coordinate estimation of the probe 200 is enabled.

When the coordinate estimation of the probe 200 is enabled, the main body control circuit 302 estimates the position of the probe 200 based on the motion data. In addition, the main body control circuit 302 instructs the adjustment of the position and the posture of the movable camera 120 so that the probe 200 is positioned within the imaging visual field of the movable camera 120 (step S34). After that, the main body control circuit 302 returns to the processing in step S31.

Here, the user U can instruct the main body control circuit 302 to search for the probe 200 by operating the main body operation unit 320 in FIG. 2 or the touch panel display 230 in FIG. 8.

When the coordinate estimation of the probe 200 is disabled in step S33, the main body control circuit 302 decides whether a command to search for the probe 200 has been received (step S35). When the command to search for the probe 200 has not been received, the main body control circuit 302 returns to the processing in step S31. In contrast, when the command to search for the probe 200 has been received, the main body control circuit 302 instructs the head control circuit 150 to rotate the supporting member 30 of the imaging head 100. In this way, the main body control circuit 302 searches for the probe 200 using the bird's eye view camera 180 (step S36).

After that, when the probe 200 is positioned within the imaging visual field of the bird's eye view camera 180, the main body control circuit 302 calculates the position of the probe 200 based on the bird's eye view image data. In addition, the main body control circuit 302 instructs the head control circuit 150 to adjust the position and the posture of the movable camera 120 so that the probe 200 is positioned within the imaging visual field of the movable camera 120 (step S37).

Next, when the probe 200 is positioned within the imaging visual field of the movable camera 120, the main body control circuit 302 instructs the head control circuit 150 to adjust the position and the posture of the movable camera 120 so that the barycenter of the plurality of markers eq of the probe 200 is positioned at the center of the imaging visual field of the movable camera 120 (step S38). After that, the main body control circuit 302 ends the tracking processing.

According to the tracking process described above, even when the probe 200 moves, the imaging visual field of the movable camera 120 follows the plurality of markers eq of the probe 200. Therefore, the user U does not need to manually adjust the imaging visual field of the movable camera 120. Accordingly, the coordinates of a desired measurement point of the measurement target S can be measured over a wide range without the need for a complicated adjustment operation.

[8] Example of Use of the Probe Camera 208

An image of the measurement target S can be displayed on the main body display unit 310 in FIG. 2 by capturing the measurement target S using the probe camera 208 in FIG. 8. An image obtained by the probe camera 208 is referred to below as a captured image.

The positional relationship between the plurality of markers eq of the probe 200 and the probe camera 208 and the characteristics (angle of view, distortion, and the like) of the probe camera 208 are stored in advance as imaging information in, for example, the main body memory 303 in FIG. 2. Therefore, when the plurality of markers eq is present within the imaging visual field of the movable camera 120, the area captured by the probe camera 208 is recognized by the main body control circuit 302 in FIG. 2. That is, the three-dimensional space corresponding to the captured image is recognized by the main body control circuit 302. In this case, it is possible to superimpose the geometric element and the measurement item set at the time of measurement of the measurement target S while displaying the captured image on the main body display unit 310.

It should be noted here that the captured image may be displayed on the touch panel display 230 of the probe 200. For example, the touch panel display 230 displays a captured image obtained by capturing a portion of a certain measurement target S to be measured in advance using the probe camera 208. In this case, the user U can easily identify the portion to be measured of another measurement target S by operating the probe 200 while visually recognizing the captured image.

[9] Effects (1) In the three-dimensional coordinate measuring device 1 described above, the reference stand 10 is provided on the floor surface. Since the reference camera 110 is fixed to the fixing section 11 of the reference stand 10, the installation state is stable. Accordingly, it is possible to generate the first position/posture information indicating the position and the posture of the movable camera 120 with respect to the reference camera 110 with high accuracy by capturing the markers ep of the reference member 190 using the reference camera 110.

The movable camera 120 is rotatable relative to the fixing section 11 of the reference stand 10. In this case, by rotating the movable camera 120, the range that can be captured by the movable camera 120 is expanded without expanding the imaging visual field of the movable camera 120. Accordingly, it is possible to generate the second position/posture information indicating the position and the posture of the probe 200 with respect to the movable camera 120 with high accuracy by capturing the plurality of markers eq of the probe 200 using the movable camera 120.

Accordingly, the third position/posture information indicating the position and the posture of the probe 200 with respect to the reference camera 110 can be generated with high accuracy based on the first and second position/posture information.

In addition, in the structure described above, the reference camera 110, the movable camera 120, and the reference member 190 are accommodated in the casing 90. Therefore, dust and disturbance light are less likely to enter the space surrounding the reference camera 110, the movable camera 120, and the reference member 190. Accordingly, the reliability of the third position/posture information is improved.

Based on the generated third position/posture information, the coordinates of measurement point on the measurement target S are calculated. As a result, coordinates can be measured over a wide range with high accuracy and high reliability.

(2) In the imaging head 100 described above, the reference camera 110 is fixed to the reference stand 10 so that the imaging visual field of the reference camera 110 faces upward. This fixes the reference camera 110 onto the reference stand 10 easily and stably.

Other Embodiments (1) Although each of the plurality of markers ep of the reference member 190 has a planar circular shape in the embodiment described above, the invention is not limited to this example. In the reference member 190, the position and the posture of the movable camera 120 only needs to be calculated based on the image data obtained by capturing using the reference camera 110.

The shape of each of the markers ep is not limited to a planar circular shape, and may be a planar polygonal shape, a planar elliptical shape, a planar star shape, or a spherical shape. Alternatively, the reference member 190 may be provided with, for example, a plurality of linear markers formed in a grid, may be provided with annular markers, or may be provided with coded markers.

(2) In the embodiment described above, each of the plurality of markers ep of the reference member 190 has a self-emission structure in which the plurality of light emitting elements L releases light by emitting light, but the present invention is not limited to this example. Each of the markers ep may have a retroreflective structure. In this case, when the reference camera 110 captures the plurality of markers ep, the markers ep need to be irradiated with light.

(3) In the embodiment described above, the movable camera 120 with a cyclopean eye is used as a movable imaging unit for capturing the probe 200, but the invention is not limited to this example. A compound eye camera may be used as the movable imaging unit.

(4) In the embodiment described above, the reference camera 110 with a cyclopean eye is used as the reference imaging unit for capturing the plurality of markers ep of the reference member 190, but the invention is not limited to this example. A compound eye camera may be used as the reference imaging unit.

(5) In the embodiment described above, the reference camera 110 is provided so that the optical axis 110c thereof is orthogonal to the upper surface of the fixing section 11 of the reference stand 10, but the invention is not limited to this example. The reference camera 110 may be provided so that the optical axis 110c thereof is inclined with respect to the upper surface of the fixing section 11 of the reference stand 10.

(6) In the three-dimensional coordinate measuring apparatus 1 according to the embodiment described above, the bird's eye view camera 180 is attached to the supporting member 30, but the bird's eye view camera 180 may be attached to the fixing and coupling section 20. In this case, the bird's eye view camera 180 desirably has a wider angle of view because the bird's eye view camera 180 does not rotate in the horizontal direction when the supporting member 30 rotates. Alternatively, the bird's eye view camera 180 does not need to be provided. In this case, the structure of the three-dimensional coordinate measuring device 1 is simplified and the number of components is reduced.

(7) In the three-dimensional coordinate measuring apparatus 1 according to the embodiment described above, the movable camera 120 is configured so that the imaging visual field thereof can be moved in the up-down direction by the tilt rotation mechanism 143, but the present invention is not limited to this example. The tilt rotation mechanism 143 does not need to be provided. In this case, the imaging visual field of the movable camera 120 rotates only in the horizontal direction about the optical axis 110c of the reference camera 110.

(8) In the embodiment described above, the bellows 50 is provided to optically and spatially block the imaging space rs (FIG. 5) including the imaging visual field of the reference camera 110 from the outside of the imaging space rs, the invention is not limited to the example.

Between the movable member 40 and the rotation base 31, a curtain-like soft material capable of optically and spatially blocking the imaging space rs from the outside of the imaging space rs may be provided instead of the bellows 50. For example, cloth or rubber may be used as the soft member. In this case, the soft material needs to be provided so as not to interfere with the imaging visual field of the reference camera 110 when the movable member 40 rotates.

(9) In the embodiment described above, the bellows 50 is provided so as to optically and spatially block the imaging space rs (FIG. 5) including the imaging visual field of the reference camera 110 from the outside of the imaging space rs, but the invention is not limited to this example.

When the casing 90 sufficiently suppresses light from entering the imaging space rs from the outside of the imaging space rs, the imaging space rs does not need to be optically blocked from the outside of the imaging space rs. In addition, when the temperature atmosphere in the casing 90 is held in a uniform and stable state, the imaging space rs does not need to be spatially blocked from the outside of the imaging space rs. Accordingly, the bellows 50 may not necessarily be provided in these cases.

(10) In the embodiment described above, the lower surface of the reference member 190 is configured by one flat surface. The invention is not limited to this example and the lower surface of the reference member 190 may be configured by one or more steps and a plurality of flat surfaces. In this case, by arranging the plurality of markers ep on at least one of the plurality of flat surfaces, the position and the posture of the movable camera 120 with respect to the reference camera 110 can be calculated as in the example described above.

[11] Correspondence Between the Components of Claims and the Sections of the Embodiment Although the example of correspondence of the components of claims and sections of the embodiment will be described below, the invention is not limited to the following example.

In the embodiment described above, the plurality of markers eq of the probe 200 is an example of the plurality of measurement markers, the reference stand 10 is an example of the reference base, the reference camera 110 is an example of the reference imaging unit, and the movable camera 120 is an example of the movable imaging unit.

In addition, the plurality of markers ep of the reference member 190 is an example of the reference marker, the main body control circuit 302 is an example of the calculation unit and the measurement unit, the upper surface 41 of the movable member 40 is an example of the attachment section, and the bellows 50 is an example of the space blocking member and the light blocking member, the rotation driving circuit 140 is an example of the rotation driving unit, and the head control circuit 150 and the main body control circuit 302 are examples of the rotation driving unit.

In addition, the touch panel display 230, the probe control unit 201, the main body operation unit 320, and the main body control circuit 302 are examples of the accepting unit.

As the components of the claims, other various elements having the structure or function described in the claims can also be used.

What is claimed is:

1. A three-dimensional coordinate measuring device comprising:
    a probe that has a plurality of measurement markers and instructs a measurement point on a measurement target;
    a reference base provided on an installation surface;
    a movable imaging unit rotatably supported on the reference base, configured to capture an image of a plurality of measurement markers of the probe to generate measurement image data indicating the image of the plurality of measurement markers;
    a reference marker rotatably supported together with the movable imaging unit on the reference base;
    a reference imaging unit fixed to the reference base, configured to capture an image of the reference marker to generate reference image data indicating the image of the reference marker;
    a casing in which the reference imaging unit, the movable imaging unit, and the reference marker are accommodated; and
    a calculation unit that generates first position/posture information indicating a position and a posture of the movable imaging unit based on the reference image data, generates second position/posture information indicating a position and a posture of the probe with respect to the movable imaging unit based on the measurement image data, generates third position/posture information indicating a position and a posture of the probe with respect to the reference imaging unit based on the generated first and second position/posture information, and calculates coordinates of the measurement point indicated by the probe based on the generated third position/posture information.

2. The three-dimensional coordinate measuring device according to claim 1, further comprising:
a movable member provided rotatably relative to the reference base, the movable imaging unit being fixed to the movable member,
wherein the reference marker is provided on at least one of the movable imaging unit and the movable member.

3. The three-dimensional coordinate measuring device according to claim 2,
wherein the movable member has an attachment section to which the movable imaging unit is fixed,
the reference marker is provided on the movable member so as to face a side opposite to the attachment section, and
the reference imaging unit is placed on a side opposite to the movable imaging unit with respect to the movable member.

4. The three-dimensional coordinate measuring device according to claim 3,
wherein the reference imaging unit is fixed to the reference base so that an imaging visual field of the reference imaging unit faces upward and
the movable member is provided above the reference imaging unit.

5. The three-dimensional coordinate measuring device according to claim 1, further comprising:
a space blocking member that spatially blocks an imaging space including an imaging visual field of the reference imaging unit from the reference imaging unit to the reference marker, from an outside of the imaging space.

6. The three-dimensional coordinate measuring device according to claim 1, further comprising:

a light blocking member that optically blocks the imaging space including the imaging visual field of the reference imaging unit from the reference imaging unit to the reference marker from the outside of the imaging space.

7. The three-dimensional coordinate measuring device according to claim 1,
wherein the reference base has a fixing section to which the reference imaging unit is fixed and
a leg section that supports the fixing section on the installation surface.

8. The three-dimensional coordinate measuring device according to claim 1, further comprising:
a rotation driving unit that rotates the movable imaging unit relative to the reference base; and
a rotation control unit that controls the rotation driving unit so that the plurality of measurement markers is positioned within an imaging visual field of the movable imaging unit.

9. The three-dimensional coordinate measuring device according to claim 1, further comprising:
an accepting unit that accepts a geometric element and a measurement item selected from a plurality of predetermined geometric elements and a plurality of predetermined measurement items; and
a measurement unit that calculates a value of the selected measurement item concerning the selected geometric element specified by one or more measurement points in the measurement target based on the geometric element and the measurement item accepted by the accepting unit and coordinates of the one or more measurement points calculated by the calculation unit.

* * * * *